US008076032B1

(12) United States Patent
West et al.

(10) Patent No.: US 8,076,032 B1
(45) Date of Patent: Dec. 13, 2011

(54) ELECTROLYTE INCLUDING SILANE FOR USE IN ELECTROCHEMICAL DEVICES

(76) Inventors: Robert C. West, Madison, WI (US); Khalil Amine, Downers Grove, IL (US); Zhengcheng Zhang, Monona, WI (US); Qingzheng Wang, Bolingbrook, IL (US); Nicholas A. A. Rossi, Madison, WI (US); Sang Young Yoon, Saugus, CA (US); Hiroshi Nakahara, Santa Clarita, CA (US)

( * ) Notice: Subject to any disclaimer, the term of this patent is extended or adjusted under 35 U.S.C. 154(b) by 1347 days.

(21) Appl. No.: 11/056,869

(22) Filed: Feb. 10, 2005

Related U.S. Application Data

(63) Continuation-in-part of application No. 11/053,338, filed on Feb. 8, 2005, and a continuation-in-part of application No. 10/977,313, filed on Oct. 28, 2004, and a continuation-in-part of application No. 10/971,507, filed on Oct. 21, 2004, now abandoned, and a continuation-in-part of application No. 10/971,913, filed on Oct. 21, 2004, and a continuation-in-part of application No. 10/971,926, filed on Oct. 21, 2004, and a continuation-in-part of application No. 10/971,912, filed on Oct. 21, 2004, and a continuation-in-part of application No. 10/971,926, filed on Oct. 21, 2004, and a continuation-in-part of application No. 10/962,125, filed on Oct. 7, 2004, now abandoned, and a continuation-in-part of application No. 10/810,080, filed on Mar. 25, 2004.

(60) Provisional application No. 60/601,452, filed on Aug. 13, 2004, provisional application No. 60/543,951, filed on Feb. 11, 2004, provisional application No. 60/543,898, filed on Feb. 11, 2004, provisional application No. 60/542,017, filed on Feb. 4, 2004.

(51) Int. Cl.
    *H01M 6/18* (2006.01)
(52) U.S. Cl. ...................................... 429/313
(58) Field of Classification Search ................. None
    See application file for complete search history.

(56) References Cited

U.S. PATENT DOCUMENTS

| | | |
|---|---|---|
| 3,172,899 A | 3/1965 | Balley |
| 3,530,159 A | 9/1970 | Gulnet at al. |
| 3,734,876 A | 5/1973 | Chu |
| 4,259,467 A | 3/1981 | Keogh et al. |
| 4,654,279 A * | 3/1987 | Bauer et al. ............... 429/312 |
| 4,830,939 A | 5/1989 | Lee et al. |
| 4,849,856 A | 7/1989 | Funari et al. |
| 4,908,283 A | 3/1990 | Takahashi et al. |
| 5,037,712 A | 8/1991 | Shackle et al. |
| 5,112,512 A | 5/1992 | Nakamura |
| 5,272,021 A | 12/1993 | Asai et al. |
| 5,300,375 A | 4/1994 | Chaloner-Gill |
| 5,362,493 A | 11/1994 | Skotheim et al. |
| 5,419,984 A | 5/1995 | Chaloner-Gill et al. |
| 5,475,127 A | 12/1995 | Klein et al. |
| 5,538,812 A | 7/1996 | Lee et al. |
| 5,593,787 A | 1/1997 | Dauth et al. |
| 5,609,974 A | 3/1997 | Sun |
| 5,633,098 A | 5/1997 | Narang et al. |
| 5,690,702 A | 11/1997 | Skotheim et al. |
| 5,700,300 A | 12/1997 | Jensen et al. |
| 5,731,104 A | 3/1998 | Ventura et al. |
| 5,753,389 A | 5/1998 | Gan et al. |
| 5,772,934 A | 6/1998 | MacFadden |
| 5,882,812 A | 3/1999 | Visco et al. |
| 5,885,733 A | 3/1999 | Ohsawa et al. |
| 5,919,587 A | 7/1999 | Mukherjee et al. |
| 5,961,672 A | 10/1999 | Skotheim et al. |
| 6,013,393 A | 1/2000 | Taniuchi et al. |
| 6,015,638 A | 1/2000 | Ventura et al. |
| 6,124,062 A | 9/2000 | Horie et al. |
| 6,168,885 B1 | 1/2001 | Narang et al. |
| 6,181,545 B1 | 1/2001 | Amatucci et al. |
| 6,245,465 B1 | 6/2001 | Angell et al. |
| 6,248,481 B1 | 6/2001 | Visco et al. |
| 6,252,762 B1 | 6/2001 | Amatucci |
| 6,268,088 B1 | 7/2001 | Oh et al. |
| 6,337,383 B1 | 1/2002 | West et al. |
| 6,447,952 B1 | 9/2002 | Spiegel et al. |
| 6,482,912 B2 | 11/2002 | Boudjouk et al. |
| 6,495,287 B1 | 12/2002 | Kolb et al. |
| 6,573,009 B1 | 6/2003 | Noda et al. |

(Continued)

FOREIGN PATENT DOCUMENTS

EP    0 450 981 A1    10/1991

(Continued)

OTHER PUBLICATIONS

Official English Translation of JP 62-209169 published Sep. 14, 1987.*
M. Armand, New Electrode Material, Prineedings of the NATO Sponsored Advanced Study Institute on Fast Ion Transport in Solids, Solid State Batteries and Devices, 1972, Beigirate, Italy.
D. Fenton et al., Complexes of Alkali Metal Ione with Poly(Ethylene Oxide), Polymer, Nov. 1973, 589, 14.
S. Kohama et al., Alcoholysis of Poly(methylhydrogenslloxene), Journal of Applied Polymer Silence, 1977, 21, 863-867.
E. Tsuchida et al., Conduction of Lithium Ions in Polyvinyldene Fluoride and Its Derivates-I, Electrochimica Acta, 1983, 591-595, 28(5).
L Hardy et al., Chloride Ion Conductivity in a Plasticized Quaternary Ammonium Polymer, Macromolecules, 1984, 975-977, 17.
P. Blonsky et al, Poiyphosphazene Solid Electrolytes, Journal of American Chemical Society, 1984, 6854-6856, 106.

(Continued)

*Primary Examiner* — Robert Hodge
(74) *Attorney, Agent, or Firm* — Joseph T. Leone, Esq.; DeWitt Ross & Stevens S.C.

(57) ABSTRACT

The electrolyte includes one or more salts and a silane. The silane has a silicon linked to one or more first substituents that each include a poly(alkylene oxide) moiety or a cyclic carbonate moiety. The silane can be linked to four of the first substituents. Alternately, the silane can be linked to the one or more first substituents and one or more second substituents that each exclude both a poly(alkylene oxide) moiety and a cyclic carbonate moiety.

13 Claims, 9 Drawing Sheets

U.S. PATENT DOCUMENTS

| | | | |
|---|---|---|---|
| 6,610,109 | B2 | 8/2003 | Noh |
| 6,653,015 | B2 | 11/2003 | Yoshida et al. |
| 2002/0028388 | A1 | 3/2002 | Lee |
| 2002/0051911 | A1 | 5/2002 | Okada |
| 2002/0076619 | A1* | 6/2002 | Yamada et al. ............... 429/324 |
| 2002/0192554 | A1 | 12/2002 | Woo et al. |
| 2003/0036003 | A1 | 2/2003 | Shchori et al. |
| 2003/0099884 | A1 | 5/2003 | Chiang et al. |
| 2003/0104282 | A1 | 6/2003 | Xing et al. |
| 2003/0180624 | A1 | 9/2003 | Oh et al. |
| 2003/0180625 | A1 | 9/2003 | Oh et al. |
| 2003/0198869 | A1 | 10/2003 | West et al. |
| 2004/0151951 | A1* | 8/2004 | Hyung et al. ..................... 429/9 |
| 2004/0197668 | A1 | 10/2004 | Jung et al. |

FOREIGN PATENT DOCUMENTS

| | | | |
|---|---|---|---|
| EP | 0 525 728 | A1 | 2/1993 |
| EP | 0 561 296 | A2 | 2/1994 |
| EP | 0 561 296 | A3 | 2/1994 |
| EP | 0 922 049 | B1 | 2/1998 |
| EP | 0 932 215 | A1 | 1/1999 |
| EP | 0 796 511 | B1 | 6/1999 |
| EP | 1 024 502 | A1 | 8/2000 |
| EP | 0 932 215 | B1 | 5/2001 |
| EP | 1 202 374 | A1 | 5/2002 |
| JP | 59-224072 | A2 | 12/1964 |
| JP | 57-034661 | | 2/1982 |
| JP | 57-034662 | | 2/1982 |
| JP | 57-080670 | | 5/1982 |
| JP | 57-111957 | | 7/1982 |
| JP | 57-176669 | A2 | 10/1982 |
| JP | 60-195877 | | 10/1985 |
| JP | 60-216461 | | 10/1985 |
| JP | 61-288374 | | 12/1986 |
| JP | 62-209169 | A2 | 9/1987 |
| JP | 63-010466 | | 1/1988 |
| JP | 63-310569 | | 12/1988 |
| JP | 02-080462 | | 3/1990 |
| JP | 02-282274 | | 10/1990 |
| JP | 02-291803 | | 12/1990 |
| JP | 03-139566 | | 6/1991 |
| JP | 60-052893 | A2 | 7/1992 |
| JP | 05-036441 | | 2/1993 |
| JP | 05-290616 | | 11/1993 |
| JP | 07240349 | A * | 9/1995 |
| JP | 07-320782 | | 12/1995 |
| JP | 08-078053 | A2 | 3/1996 |
| JP | 09-306544 | | 11/1997 |
| JP | 11-214032 | A2 | 1/1998 |
| JP | 10-172615 | A2 | 8/1998 |
| JP | 11-185804 | | 7/1999 |
| JP | 11-238523 | | 8/1999 |
| JP | 11-302364 | A2 | 11/1999 |
| JP | 11-302383 | | 11/1999 |
| JP | 11-306856 | A2 | 11/1999 |
| JP | 11-306857 | A2 | 11/1999 |
| JP | 2000-056123 | | 2/2000 |
| JP | 2000-154254 | A2 | 6/2000 |
| JP | 2000-222939 | A2 | 8/2000 |
| JP | 2000-277152 | A2 | 10/2000 |
| JP | 2001-068115 | | 3/2001 |
| JP | 2001-110455 | A2 | 4/2001 |
| JP | 2001- 185165 | A2 | 7/2001 |
| JP | 2001-283907 | A2 | 10/2001 |
| JP | 2001-283913 | | 10/2001 |
| JP | 2002-063936 | A2 | 2/2002 |
| JP | 2002-151150 | A2 | 5/2002 |
| JP | 2002 155142 | A2 | 5/2002 |
| JP | 2002-296913 | A2 | 10/2002 |
| JP | 2002-343440 | A2 | 11/2002 |
| JP | 2003-002974 | A2 | 1/2003 |
| JP | 2004-235141 | | 8/2004 |
| WO | WO 96/21953 | | 7/1996 |
| WO | WO 98/07729 | A1 | 2/1998 |
| WO | WO 00/00495 | A1 | 1/2000 |
| WO | WO 00/06854 | | 2/2000 |
| WO | WO 00/25323 | A1 | 5/2000 |
| WO | WO 01/73884 | A1 | 10/2001 |
| WO | WO 01/96446 | A1 | 12/2001 |
| WO | WO 01/99209 | A2 | 12/2001 |
| WO | WO 03/083971 | A1 | 9/2003 |
| WO | WO 03/083970 | A1 | 10/2003 |
| WO | WO 03/083972 | A1 | 10/2003 |
| WO | WO 03/083973 | A1 | 10/2003 |
| WO | WO 03/083974 | A1 | 10/2003 |
| WO | WO 03/090299 | A1 | 10/2003 |

OTHER PUBLICATIONS

D. Bannister et al. A Water-Solubie Siloxane: Poly(ethylene glycol) Comb Polymer, Journal of Polymer Science: Polymer Letters Edtllon, 1985, 465-467, 23.

I. Kelly et al., Poly(Ethylene Oxide) Electrolytes for Operation at Near Room Temperature, Journal of Power Sources, 1985, 13-21, 14.

D. Fish et al., Conductivity of Solid Complexes of Lithium Perchlorate with Polyn-([w-methoxythexa(oxythylene) ethoxy] methylsiloxane)$^{a)}$, Makromol. Chem., Rapid Commun., 1986. 115-120, 7.

P. Hall et al. Ion Conductivity in Polysiloxane Comb Polymers With Ethylene Glycol Teeth, Polymer Communications, 1988, 3 pages, 27.

D.R. MacFarlane et al., Synthesis and Aqueous Solution Phase Behavior of Siloxane-Poly (Alkylene Glycol) Comb Copolymers, Department of Chemistry, Monash University, Clayton. Victoria, Australia, Polymer Preprints, 1987, 26.405-406.

D. Fish et al., Polymer Electrolyte Complexes of $ClO_4$ and Comb Polymers of Siloxane with Oligo-oxyethylene Side Chains, British Polymer Journal, 1988, 281-288, 20, 3.

S. Ganapathiappan et al., A New Class of Cation Conductors: Polyphosphazene Sulfonates, Macromolecules, 1988, 2299-2301, 21.

I. Khan et al., Comblike Polysiloxanes with Oligo(oxyethylene) Side Chains, Synthesis and Properties, Macromolecules, 1988, 2684-2689, 21.

R. Spindler et al., Investigations of a Siloxane-Based Polymer Electrolyte Employing $^{13}$C, $^{23}$Si, $^{7}$Li, and $^{23}$Na Solid State NMR Spectroscopy, Journal of American Chemical Society, 1988, 3036-3043, 110.

R. Spindler et al., Synthesis NMR Characterization, and Electrical Properties of Siloxane-Based Polymer Electrolytes, Macromolecules, 1988, 648-654, 21.

S. Ganapathiappan et al., Synthesis, Characterization and Electrical Response of Phosphazene Polyelectrolytes, Journal of America Chemical Society, 1989, 4091-4095, 111.

M. Ouchi et al., Convenient and Efficient Tosylation of Oligoethylene Glycols and the Related Alcohols in Tetrahydrofuran-Water in the Presence of Sodium Hydroxide,Tthe Chemical Society of Japan, 1990, 1250-1262, 63, 4.

L Dominey et al., Thermally Stable Lithium Salts for Polymer Etectrolytes, Electrochimice Acta, 1992, 1551-1554, 37(9).

F. Alloin et al., Triblock Copolymers and Networks Incorporating Oligo (Oxyethylene) Chains, Sold State Ionics, 1993, 3-9, 60.

C. St. Pierre et al., Lithium-Metal-Polymer Battery for Electric Vehicle and Hybrid Electric Vehicle Applications, www.avestor.com/en/automotive.html, info@avestor.com, 1993, 11 pages.

G. Zhou et al., Solvent-Free Cation-Conduction Polysiloxane Electrolytes with Pendant Oligo(oxyethylene) and Sulfonate Groups, Macromolecules, 1993, 2202-2208, 26.

M. Gauthier et al., Large Lithium Polymer Battery Development The Immobile Solvent Concept, Journal of Power Sources, 1995, 163-169, 54.

H. Allcock et al., Polyphosphazenes Bearing Branched and Linear Oligoethyleneoxy Side Groups as Solid Solvents for Ionic Conduction, Macromolecules, 1996, 7544-7552, 29.

K. Abraham et al., Highly Conductive PEO-Like Polymer Electrolytes, Journal of Chemical Materiels, 1997, 1978-1988, 9(9).

M. Furlani et al., Time Resolved Luminescence and Vibrational Spectroscopic Studies on Complexes of Poly(Ethylene Oxide) Oligomers and Eu(TFS1), Salt, 11th International Conference on Solid State Ionics, 1997, 10 pages.

J. Gnanaraj et al., Studies on Comb-like Polymer Blend with Poly(Ethylene Oxide)—Lithium Perchlorate Salt Complex Electrolyte, Polymer, 1997, 3709-3712, 38(14).

F. Gray, Polymer Electrolytes, RSC Materials Monographs, UK 1997, 48-49.

C. Letourneau et al., Progress in Lithium-Metal-Polymer Battery System for Electric Vehicles, http://www.avestor.com/lactivefiles/evs15.pdf, info@avestor.com, INTELEC, Oct. 1998, Canada, 1-10.

J. Blackwell et al., $B(C_6F_4)_3$-Catalyzed Sitation of Alcohols: A Mild, General Method for Synthesis for Silyl Ethers, Journal of Organic Chemistry, 1999, 4887-4892, 64.

R. Hooper et al., A Highly Conductive Solid-State Polymer Electrolyte Based on a Double-Comb Polyslioxane Polymer with Oligo(Ethylane Oxide) Side Chains. Organometallics, American Chemical Society, 1999, 3249-3251, 18(17).

Z. Wang et al., Thermal, Electrochemical, and Spectroscopic Characterizations of Hyperbranched Polymer Electrolyte, Journal of Electrochemical Society, 1999, 2209-2215, 146(6).

M. Anderman et al., Advanced Batteries for Electric Vehicles: An Assessment of Performance, Cost, and Availability, Prepared for State of California Air Resources Board by the Year 2000 Battery Technology Advisory Panel, 2000, Hx and 60-65.

A. Reich et al., Gel Electrolytes on the Basis of Oligo(Ethylene Glycol), Dimethacrylates—Thermal, Mechanical and Electrochemical Properties in Relationship to the Network Structure, Polymer, 2000, 3821-3836, 41.

R. Hooper at al.. Highly Conductive Siloxane Polymers, Macromolecules, 2001, 931-936, 34.

X. Hou et al., Novel interpenetrating Polymer Network Electrolytes, Polymer, 2001, 4181-4188, 42.

C.F. Rome, The Unique Properties of Silicone at the Service of the Petroleum Industry, Hydrocarbon Asia, 2001, 42-49, 'www.hcasia.eafan.com/mag/may-jun01/Tech-Silocone.pdf'.

Wu, Xu et al., LiBOB and Its Derivatives Weakly Coordinating Anions, and the Exceptional Conductivity of Their Nonaqueous Solutions, Electrochemical and Solid-State Letters, 2001, E1-E4, 4(1).

W. Xu et al., Ionic Conductivity and Electrochemical Properties of Lithium Orthoborate Salts, http://www.electrochem.org/meetings/past/200/abstracts/symposia/bla/0107.pdf, United States, Sep. 5, 2001.

N. Katayama et al, Thermal Stability of Propylene Carbonate and Ethylene Carbonate-Propylene Carbonate-Based Electrolytes for Use in Li Cells, Journal of Power Sources, 2002,1-6, 4769, http://www.sciencedirect.com/web-editions.

K. Xu et al., LIBOB as Salt for Lithium-Ion Batteries, Electrochemical and Solid State Letters, 2002, pp. A26-A29, vol. 5(1).

J. Alper. The Battery: Nat Yet a Terminal Case, Science, May 2002, 1224-1226, vol. 296, www.sciencemag.org.

Y. Kang et al., Solid Polymer Electrolytes based on Cross-linked Siloxane-g-oligoethylene oxide: Ionic conductivity and Electrochemical Properties, Abstract book of 11th international Meeting on Lithium Batteries (IMLB 11), Jun. 23-28, 2002.

B. Oh et al., New Interpenetrating Electrolyte Network-Type Siloxane Polymer Electrolyte. Electrochemical and Solid State Letters, 2002, E59-E61, 5(11), The Electrochemical Society, Inc., Sep. 11, 2002.

T. Fujii et al., Application of LiBOB as an Electrolyte Salt for 4 V Class Lithium Ion Rechargeable Cells, whttp://www2.electrochem.org/cgi-bin/abs?mtg=202&abs=0203, Oct. 24, 2002, United States.

W. Xu at al., Structures of Orthoborate Anions and Physical Properties of Their Lithium Salt Nonequeous Solutions, Journal of the Electrochemical Society, 2003, 1-0, 150(1).

International Search Report, dated May 1, 2003, received in relation to Application No. PCT/US03/02127.

Y. Kang et al., Solid Polymer Electrolytes Based on Cross-Linked Polysiloxane-g-oligo(ethylene oxide): Ionic Conductivity and Electrochemical Properties, Journal of Power Sources 119-121 (Jun. 1, 2003), pp. 448-453.

International Search Report, dated Jul. 11, 2005, received in relation to Application No. PCT/US03/02128.

International Search Report, dated Jul. 11, 2003, received in relation to Application No. PCT/US03/08740.

International Search Report, dated Sep. 12, 2003, received in relation to Application No. PCT/US03/08784.

International Search Report, dated Oct. 9, 2003, received in relation to Application No. PCT/US03/08779.

International Search Report, dated Oct. 9, 2003, received in relation to Application No. PCT/US03/08783.

Z. Zhang et al, Cross-Linked Network Polymer Electrolytes Based on a Polysiloxane Backbone with Oligo(oxyethylene) Side Chains: Synthesis and Conductivity, Macromolecules. Oct. 28, 2003, vol. 36, No. 24, 9176-9180.

NICODOM Ltd., Inorganic Library of FT-IR Spectra Inorganics II—Boron Compounds, homepage, website http://www.ftir.cz/INLIB2.html and http://www.ftir.cz/home_page_of_nicodom_aro.htm.

R. Zhang et al., Modification of Polymethythyldrosiloxane by Dehydrocoupling Reactions Catalyzed by Transition Metal Complexes: Evidence for the Preservation of Linear Siloxane Structures, Silicon Chemistry, 2003, vol. 2, 271-277.

Z. Zhang et al., Network-Type Ionic Conductors Based on Oligoethyleneoxy-Functionalized Pentamethylcyclopentaslioxanes. Macromolecules, 2005, vol. 38, 5714-5720.

Z. Zhang et al., Synthesis and Ionic Conductivity of Cyclosiloxanes with Ethyleneoxy-Containing Substituents, Chem. Mater., 2005, vol. 17, 5646-5650.

M. Ue, Recent Technological Trend in Electrolyte Materials for Li-Ion Batteries, Abstract 31, International Meeting on Lithium Batteries (IMLB 12), 2004, The Electrochemical Society, Inc.

* cited by examiner

ELECTROLYTE INCLUDING SILANE FOR USE IN ELECTROCHEMICAL DEVICES

REFERENCE TO RELATED APPLICATIONS

This application claims the benefit of U.S. Provisional Patent application Ser. No. 60/601,452, filed on Aug. 13, 2004, entitled "Electrolyte Including Silane for Use in Electrochemical Devices;" and of U.S. Provisional Patent Application Ser. No. 60/543,951, filed on Feb. 11, 2004 and entitled "Siloxanes;" and of U.S. Provisional Patent Application Ser. No. 60/543,898, filed on Feb. 11, 2004, and entitled "Siloxane Based Electrolytes for Use in Electrochemical Devices;" and of U.S. Provisional Patent application Ser. No. 60/542,017, filed on Feb. 4, 2004, entitled "Nonaqueous Electrolyte Solvents for Electrochemical Devices;" and is a continuation-in-part of U.S. patent application Ser. No. 10/810,080, filed on Mar. 25, 2004, entitled "Electrolyte for Use in Electrochemical Devices;" and is a continuation-in-part of U.S. patent application Ser. No. 10/971,507, filed on Oct. 21, 2004 now abandoned, entitled "Electrochemical Device Having Electrolyte Including Disiloxane;" and is a continuation-in-part of U.S. patent application Ser. No. 10/971,913, filed on Oct. 21, 2004, entitled "Electrochemical Device Having Electrolyte Including Trisiloxane;" and is a continuation-in-part of U.S. patent application Ser. No. 10/971,926, filed on Oct. 21, 2004, entitled "Electrochemical Device Having Electrolyte Including Tetrasiloxane; and is a continuation-in-part of U.S. patent application Ser. No. 10/962,125, filed on Oct. 7, 2004 now abandoned, and entitled "Battery Having Electrolyte Including One or More Additives;" and is a continuation-in-part of U.S. patent application Ser. No. 10/971,912, filed on Oct. 21, 2004, and entitled "Battery Having Electrolyte Including Organoborate Salt;" and is a continuation-in-part of U.S. patent application Ser. No. 11/053,338, filed on Feb. 8, 2005, and entitled "Reduction of Impurities in Battery Electrolyte;" and is a continuation-in-part of U.S. patent application Ser. No. 10/977,313, filed on Oct. 28, 2004, and entitled "Electrolyte Including Silane for Use in Electrochemical Devices;" each of which is incorporated herein in its entirety.

STATEMENT REGARDING FEDERALLY SPONSORED RESEARCH OR DEVELOPMENT

This invention was made with United States Government support under NIST ATP Award No. 70NANB043022 awarded by the National Institute of Standards and Technology (NIST). The United States Government has certain rights in this invention pursuant to NIST ATP Award No. 70NANB043022 and pursuant to Contract No. W-31-109-ENG-38 between the United States Government and the University of Chicago representing Argonne National Laboratory, and NIST 144 LM01, Subcontract No. AGT DTD Sep. 9, 2002.

FIELD

The present invention relates to silanes and more particularly to electrochemical devices with electrolytes that include silanes.

BACKGROUND

The increased demand for lithium batteries has resulted in research and development to improve the safety and performance of these batteries. Many batteries employ liquid electrolytes associated with high degrees of volatility, flammability, and chemical reactivity. A variety of polysiloxane-based electrolytes have been developed to address these issues. However, polysiloxane based electrolytes typically have a low ionic conductivity that limits their use to applications that do not require high rate performance.

SUMMARY

Novel silanes are disclosed. The silanes can have a silicon linked to one or more first substituents that each include a poly(alkylene oxide) moiety or a cyclic carbonate moiety. The silanes can be linked to four of the first substituents. Alternately, the silane can be linked to the one or more first substituents and one or more second substituents that each exclude a poly(alkylene oxide) moiety and a cyclic carbonate moiety.

The silanes can be represented by: $SiR_{4-x-y}R'_xR''_y$: wherein R are each an alkenyl group, alkynyl group, alk(poly)enyl group, alk(poly)ynyl group, aryl group, substituent that includes an aryl group, alkoxy group, or monovalent ether group, R' is represented by formula I-A or formula I-C, R" is represented by Formula I-B, x is the number of R' substituents and is 0 to 4, y is the number of R" substituents and is 0 to 4,4-x-y is the number of R substituents and x+y is at least 1.

Formula I-A:

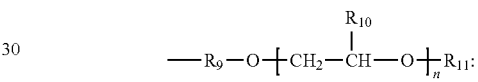

wherein $R_9$ is nil or an organic spacer; $R_{10}$ is hydrogen; alkyl or aryl; $R_{11}$ is alkyl or aryl; and n is 1 to 15.

Formula I-B:

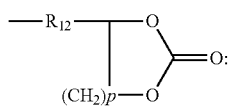

wherein $R_{12}$ is an organic spacer and p is 1 to 2.

Formula I-C:

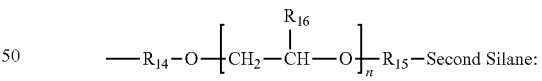

wherein $R_{14}$ is nil or a spacer; $R_{15}$ is nil or a spacer; $R_{16}$ is hydrogen, alkyl or aryl; second silane represents another silane and n is 1 to 15. The second silane can be represented by: $-SiR_{3-p-q}R'_pR''_q$, wherein each R is an alkyl group or an aryl group, R' is represented by Formula I-A or Formula I-C and R" is represented by Formula I-B, p is the number of R' substituents and is 0 to 3, q is the number of R" substituents and is 0 to 3,3-p-q is the number of R substituents.

The siloxanes are suitable for use as surfactants, wetting agents, and spreading agents. The siloxanes are especially useful in electrolytes. The electrolytes include one or more salts dissolved in a solvent that includes one or more of the above silanes. In some instances, the electrolytes also include a secondary silane. The secondary silanes can be silanes selected from the group consisting of aryltrialkoxysilanes and alkyltrialkoxysilanes. Examples of suitable secondary silanes include, but are not limited to, phenyltrimethoxysilane (PTMS), ethyltrimethoxysilane, pentafluorophenyltrimethoxylsilane, and phenethyltris(trimethylsiloxy)silane.

Suitable salts for use in the electrolyte include alkali metal salts including lithium salts. Examples of lithium salts include $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, organoborate salts and mixtures thereof. Preferred salts for use with the electrolytes include organoborate salts such as lithium bis(chelato)borates including lithium bis(oxalato)borate (LiBOB) and lithium difluoro oxalato borate (LiDfOB).

The electrolyte is generally a liquid. In some instances, the electrolyte is a solid or a gel. For instance, the electrolytes can optionally include a polymer that interacts with one or more of the silanes so as to form an interpenetrating network. The electrolyte can optionally include one or more solid polymers that are each a solid polymer when standing alone at room temperature.

Electrochemical devices that employ the electrolytes are disclosed. The electrochemical devices include one or more anodes and one or more cathodes activated by the electrolyte. In some instances, the electrolyte includes an additive selected that forms a passivation layer on an electrode included in the device. Examples of additives suitable for forming a passivation layer on a carbonaceous anode include, but are not limited to, vinyl carbonate (VC) and vinyl ethylene carbonate (VEC).

Methods of generating the above siloxanes, electrolytes and electrochemical devices are also disclosed.

DESCRIPTION

Figure 1A:
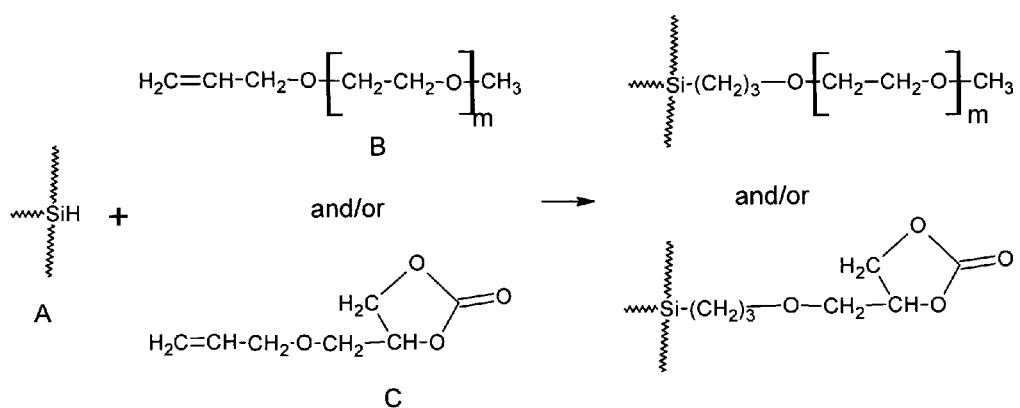
FIG. 1A illustrates a hydrosilylation reaction suitable for generating the silanes.

An electrolyte that includes one or more salts dissolved in a solvent that includes one or more silanes is disclosed. At least one of the silanes includes a silicon linked to one or more first substituents that each include a poly(alkylene oxide) moiety or a cyclic carbonate moiety. Examples of first substituents are side chains that include a poly(alkylene oxide) moiety, side-chains that includes a cyclic carbonate moiety, and cross links that cross-link the silane to a second silane and include a poly(alkylene oxide) moiety.

These silanes can yield an electrolyte with a lower viscosity than siloxane based electrolytes. The reduced viscosity can improve wetting of electrodes in an electrochemical device enough to enhance the homogeneity of the electrolyte distribution in the cell. Surprisingly, the enhanced homogeneity can be sufficient to increase the capacity and cycling properties of batteries. For instance, when the device is repeatedly cycled between 3.0 V and 4.0 V using a charge and discharge rate of C/10 (0.2 mA) after formation of a passivation layer on the anode, these electrolytes can provide a secondary battery having a discharge capacity retention greater than 90% at cycle number 35, a discharge capacity retention greater than 95% at cycle number 35 or a discharge capacity retention greater than 99% at cycle number 50. At these performance levels, the electrolytes can be suitable for use in batteries such as high-energy and long cycle life lithium secondary batteries, such as biomedical devices, electrical vehicles and satellite applications.

The electrolytes can also have high ionic conductivities in addition to the enhanced capacity and cycling properties. For instance, each of the first substituents can include a poly(alkylene oxide) moiety. The poly(alkylene oxide) moieties can help dissolve lithium salts that are employed in batteries. Accordingly, the silanes can provide an electrolyte with a concentration of free ions suitable for use in batteries. Additionally, the one or more poly(alkylene oxide) moieties can enhance the ionic conductivity of the electrolyte at room temperatures. For instance, these silanes can yield an electrolyte with an ionic conductivity higher than $1.0 \times 10^{-4}$ S/cm at 24° C. or higher than $1.1 \times 10^{-4}$ S/cm at 24° C.

In some instances, each of the first substituents include a cyclic carbonate moiety. The cyclic carbonate moieties can have a high ability to dissolve the salts that are employed in battery electrolytes. As a result, the carbonates can provide high concentrations of free ions in the electrolyte and can accordingly increase the ionic conductivity of the electrolyte. For instance, these silanes can yield an electrolyte with an ionic conductivity higher than $1.0 \times 10^{-4}$ S/cm at 24° C. or higher than $1.1 \times 10^{-4}$ S/cm at 24° C.

In some instances, one or more of the first substituents include a poly(alkylene oxide) moiety and one or more of the first substituents includes a cyclic carbonate moiety. The ability of the carbonates to provide high concentrations of free ions in the electrolyte can work in conjunction with the poly(alkylene oxide) moiety to increase the ionic conductivity of the electrolyte. For instance, these silanes can yield an electrolyte with an ionic conductivity higher than $1.0 \times 10^{-4}$ S/cm at 24° C. or higher than $1.1 \times 10^{-4}$ S/cm at 24° C.

The electrolytes are generally liquids. In some instances, the electrolyte is a solid or a gel. For instance, the electrolyte can include a cross-linked network polymer that forms an interpenetrating network with one or more silanes in the electrolyte. An electrolyte that includes an interpenetrating network can be a solid or a gel. Accordingly, the interpenetrating network can serve as a mechanism for providing a solid electrolyte or a gel electrolyte. Alternately, the electrolyte can include one or more solid polymers in addition to one or more of the silanes. The one or more solid polymers are a solid when standing alone at room temperature. The solid polymer can be employed to generate a gel electrolyte or a solid electrolyte such as a plasticized electrolyte.

An example of the silane includes a silicon linked to one or more first substituents that each include a poly(alkylene oxide) moiety or a cyclic carbonate moiety. When a first substituent includes a poly(alkylene oxide) moiety, the poly(alkylene oxide) moiety can include an oxygen linked directly to the silicon. Alternately, the first substituent can include a spacer positioned between the poly(alkylene oxide) moiety and the silicon. A spacer can enhance stability while removing the spacer can reduce viscosity and enhance conductivity. Suitable spacers include, but are not limited to, organic spacers. In some instances, the poly(alkylene oxide) moiety is a poly(ethylene oxide) moiety. In some instances, the poly(alkylene oxide) moiety is an oligo(alkylene oxide) moiety having from 1 to 15 alkylene oxide units.

The silane can include only one of the first substituents linked to a silicon or a plurality of the first substituents linked to the silicon. When the silane includes a plurality of the first substituents, the silane can include two of the first substituents, three of the first substituents or four of the first substituents. When the silane includes fewer than four first substituents, the additional substituent(s) linked to the silicon are second substituents that each exclude a poly(alkylene oxide) moiety and a cyclic carbonate moiety. Suitable second substituents include, but are not limited to, saturated or unsaturated, and/or branched or unbranched, and/or substituted or unsubstituted hydrocarbons. Example substituted hydrocarbons includes, but are not limited to, fully or partially halogenated hydrocarbons such as fully or partially fluorinated hydrocarbons. Examples of hydrocarbons that can serve as second substituents include alkenyl groups, alkynyl groups, alk(poly)enyl groups, alk(poly)ynyl groups, aryl groups, side chains that include aryl groups, alkoxy groups, and monovalent ether groups, each of which can be saturated or unsaturated, substituted or unsubstituted, and/or fully or partially halogenated. Other suitable second substituents include halogens such as chlorine and fluorine. When the silane includes a plurality of first substituents, the first substituents can each be the same or can be different. In one example, the silane includes a plurality of the first substituents and each of the first substituents is different. Alternatively, the silane includes a plurality of the first substituents and a portion of the first substituents is different from another portion of the first substituents.

Examples of the first substituents include: a side-chain that includes a poly(alkylene oxide) moiety; a side-chain that includes a cyclic carbonate moiety; and a cross link that includes a poly(alkylene oxide) moiety and that cross-links the silane to a second silane where a cross link is exclusive of a side chain. Accordingly, the silane can include one or more side-chains that each include a poly(alkylene oxide) moiety and/or one or more side-chains that each include a cyclic carbonate moiety and/or one or more cross links that each include a poly(alkylene oxide) moiety and that each cross-link the silane to a second silane.

In one example, the silane includes a silicon linked to one or more side-chains that each include a poly(alkylene oxide) moiety and linked to one or more second substituents. In another example, the silane includes a silicon linked to one or more side-chains that each include a cyclic carbonate moiety and linked to one or more second substituents. In another example, the silane includes a silicon linked to one or more cross links that each include a poly(alkylene oxide) moiety and linked to one or more second substituents.

In an example, the silane includes a silicon linked to one or more side-chains that each include a poly(alkylene oxide) moiety; to one or more side-chains that each include a cyclic carbonate moiety; and to one or more second substituents. In another example, the silane includes a silicon linked to one or more side-chains that each include a cyclic carbonate moiety; to one or more cross links that each include a poly(alkylene oxide) moiety; and to one or more second substituents. In another example, the silane includes a silicon linked to one or more side-chains that each include a poly(alkylene oxide) moiety; to one or more cross links that each include a poly(alkylene oxide) moiety; and to one or more second substituents.

In one example, the silane includes a silicon linked to four side-chains that each include a poly(alkylene oxide) moiety. Accordingly, the silane can exclude cyclic carbonate moieties. In another example, the silane includes a silicon linked to four side-chains that each include a cyclic carbonate moiety. Accordingly, the silane can exclude poly(alkylene oxide) moieties. In another example, the silane includes a silicon linked to four cross links that each include a poly(alkylene oxide) moiety.

A suitable silane can be represented by the following Formula I: $SiR_{4-x-y}R'_xR''_y$; wherein R is a second substituent such as an alkenyl group, alkynyl group, alk(poly)enyl group, alk(poly)ynyl group, aryl group, substituent that includes an aryl group, alkoxy group, or monovalent ether groups, each of which can be saturated or unsaturated, substituted or unsubstituted, and/or fully or partially halogenated. $R'_x$ is a first substituent that includes a poly(alkylene oxide) moiety and can be represented by Formula I-A or Formula I-C, $R''_y$ is a first substituent that includes a cyclic carbonate moiety and can be represented by Formula I-B, x indicates the number of R' substituents included in the silane and is 0 to 4, y indicates the number of R" substituents included in the silane is 0 to 4, 4-x-y indicates the number of R substituents, and x+y is at least 1.

Formula I-A:

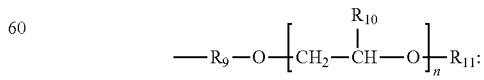

wherein $R_9$ is nil or an organic spacer; $R_{13}$ is hydrogen; alkyl or aryl; $R_{11}$ is alkyl or aryl; and n is 1 to 15, or $\geq 2$. The spacer can be an organic spacer and can include one or more —$CH_2$— groups. Other suitable spacers can include an alkylene, alkylene oxide or a bivalent ether group. These spacers can be substituted or unsubstituted. In one example, $R_9$ is represented by: —$(CH_2)_3$—.

Formula I-B:

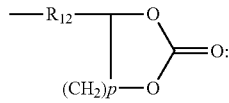

wherein $R_{12}$ is an organic spacer and p is 1 to 2. The spacer can be an organic spacer and can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{12}$ is a bivalent ether moiety represented by: —$CH_2$—O—$(CH_2)_3$— with the —$(CH_2)_3$— linked to a silicon on the backbone of the disiloxane. In another example, $R_{12}$ is an alkylene oxide moiety represented by: —$CH_2$—O— with the oxygen linked to the silicon on the silane.

Formula I-C:

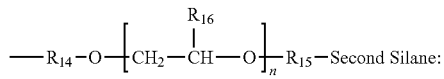

where $R_{14}$ is nil or a spacer; $R_{15}$ is nil or a spacer; $R_{16}$ is hydrogen, alkyl or aryl; second silane represents another silane and n is 1 to 15, or $\geq 2$. The spacers can be organic spacers and can include one or more —$CH_2$— groups. Other suitable spacers can include an alkylene, alkylene oxide or a bivalent ether group. These spacers can be the same or different and can be substituted or unsubstituted. In one example, $R_{14}$ and $R_{15}$ are each represented by: —$(CH_2)_3$—. The second silane can be represented by: —$SiR_{3-p-q}R'_p R''_q$, wherein R are each an alkyl group or an aryl group, R' is a substituent that includes a poly(alkylene oxide) moiety and can be represented by Formula I-A or Formula I-C, R" is a substituent that includes a cyclic carbonate moiety and can be represented by Formula I-B, p is the number of R' substituents included on the second silane and is 0 to 3, q is the number of R" substituents included on the second silane, 3-p-q is the number of R substituents, and is 0 to 3. In one example, p is 0 and q is 0. In another example, p+q is greater than or equal to 1. In yet another example, p is greater than or equal to 1. In still another example, q is greater than or equal to 1. In another example, R' is represented by Formula I-A and R" is represented by Formula I-B, p is 0 to 3 and q is 0 to 3.

One or more of the alkyl and aryl groups specified in Formula I through Formula I-C can be substituted, unsubstituted, halogenated, and/or fluorinated. When the silane includes more than one substituent represented by Formula I-A, the entities can be the same or different. When the silane includes more than one substituent represented by Formula I-B, the entities can be the same or different. When the silane includes more than one substituent represented by Formula I-C, the entities can be the same or different.

In one example of the silane according to Formula I, x=0. In another example, x is 1 to 3. In another example, y=0. In still another example, y is 1 to 3. In another example, x+y=4 or x+y=2.

In some instances, R' is represented by Formula I-A, x is greater than 0, and $R_9$ is nil. In other instances, R' is represented by Formula I-A and $R_9$ is an organic spacer. In an example, R" is represented by Formula I-B and y is greater than 0. In another example, R' is represented by Formula I-C, x is greater than 0, $R_{14}$ is nil and $R_{15}$ is nil. In still another example, R' is represented by Formula I-C, x is greater than 0, $R_{14}$ is an organic spacer and $R_{15}$ is an organic spacer.

When the silane includes more than one substituent represented by Formula I-A, the entities can be the same or different. When the silane includes more than one substituent represented by Formula I-B, the entities can be the same or different. When the silane includes more than one substituent represented by formula I-C, the entities can be the same or different.

A preferred silane includes a silicon linked to one side chain that includes a poly(alkylene oxide) moiety and linked to three second substituents. For instance, the silane can be represented by Formula I with x=1, y=0 and the R' represented by Formula I-A. Formula I-D presents an example of the silane that includes a silicon linked to one side chain that includes a poly(ethylene oxide) moiety, and linked to three alkyl groups. The poly(ethylene oxide) moiety of Formula I-D includes an oxygen liked directly to the silicon.

Formula I-D:

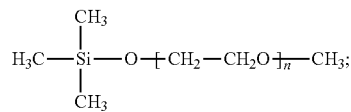

wherein n is 1 to 15. In a preferred silane according to Formula I-D, n=3. Formula I-D illustrates a poly(alkylene) oxide moiety including an oxygen linked directly to the silicon, however, a spacer can link the poly(alkylene) oxide moiety to the silicon. For instance, Formula I-E is an example of a silane with a side chain that includes a spacer linking the silicon a poly(alkylene oxide) moiety.

Formula I-E:

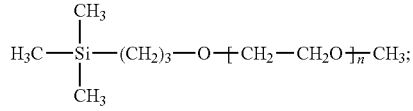

wherein n is 1 to 15, or $\geq 2$. In a preferred silane according to Formula I-E, n=3. Formula I-F presents another example of the silane that includes a silicon linked to one side chain that includes a poly(alkylene oxide) moiety, and linked to three alkyl groups. The side chain of Formula I-F includes an organic spacer positioned between the silicon and the poly(alkylene oxide) moiety.

Formula I-F:

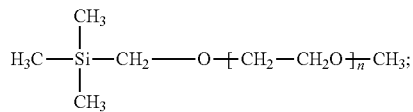

wherein n is 1 to 15, or ≧2. In a preferred silane according to Formula I-F, n=3.

Another example of the silane includes a silicon linked to two side chains that each include a poly(alkylene oxide) moiety and linked to two second substituents. For instance, the silane can be represented by Formula I with x=2 and y=0. One or both R' can be represented by Formula I-A. One or both R' can be represented by Formula I-C. In some instances, one R' is represented by Formula I-A and one R' is represented by Formula I-C. Formula I-G is an example of the silane that includes a silicon linked to two side chains that each include a poly(ethylene oxide) moiety and linked to two alkyl groups.

Formula I-G:

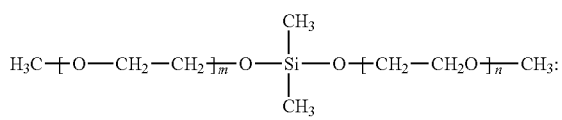

wherein m is 1 to 15, or ≧2; n is 1 to 15, or ≧2; and m can be different from n or the same as n. In a preferred silane according to Formula I-G, m=3 and n=3. Formula I-G illustrates each of the poly(alkylene) oxide moieties including an oxygen linked directly to the silicon, however, a spacer can link all or a portion of the poly(alkylene) oxide moieties to the silicon. For instance, Formula I-H is an example of a silane where one of the side chains includes a spacer linking a poly(alkylene oxide) moiety to the silicon and another side chain has a poly(alylene oxide) moiety that includes an oxygen linked directly to the silicon.

Formula I-H:

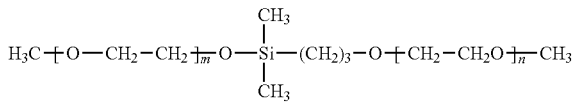

wherein m is 1 to 15, or ≧2; and n is 1 to 15, or ≧2; and m and n can be the same or different.

Another preferred silane includes a silicon linked to three side chains that each include a poly(alkylene oxide) moiety and linked to one second substituent. For instance, the silane can be represented by Formula I with x=3 and y=0. All or a portion of the R' can be represented by Formula I-A. All or a portion of the R' can be represented by Formula I-C. In some instances, a portion of the R' is represented by Formula I-A and a portion of the R' is represented by Formula I-C. Formula I-I is an example of the silane that includes a silicon linked to three side chains that each include a poly(ethylene oxide) moiety and linked to an alkyl group.

Formula I-I:

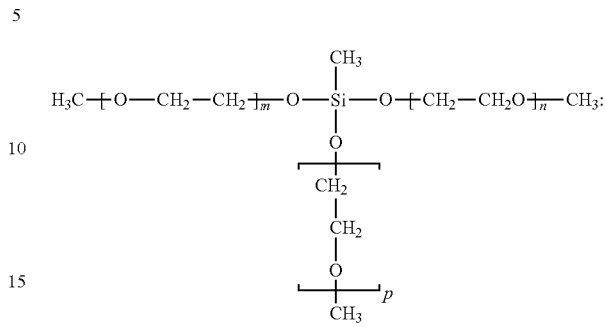

wherein m is 1 to 15, or ≧2; n is 1 to 15, or ≧2; p is 1 to 15, or ≧2; and none, a portion or all of m, n and p can be different. Formula I-I illustrates each of the poly(alkylene) oxide moieties including an oxygen linked directly to the silicon, however, a spacer can link all or a portion of the poly(alkylene) oxide moieties to the silicon. For instance, Formula I-J is an example of the silane that includes a silicon linked to three side chains where one of the side chains includes a spacer linking a poly(alkylene oxide) moiety to the silicon and two of the side chains have poly(alylene oxide) moieties that include oxygens linked directly to the silicon.

Formula I-J:

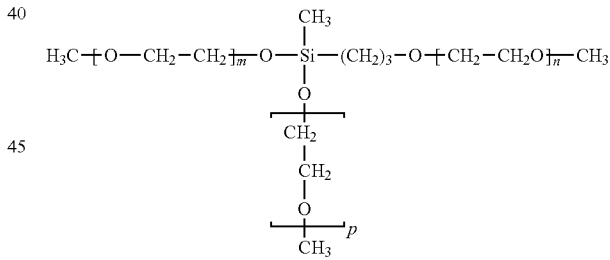

wherein m is 1 to 15, or ≧2; n is 1 to 15, or ≧2; p is 1 to 15, or ≧2; and none, a portion, or all of m, n and p can be different.

Another preferred silane includes a silicon linked to four side chains that each include a poly(alkylene oxide) moiety. For instance, the silane can be represented by Formula I with x=4 and y=0. All or a portion of the R' can be represented by Formula I-A. All or a portion of the R' can be represented by Formula I-C. In some instances, a portion of the R' is represented by Formula I-A and a portion of the R' is represented by Formula I-C. Formula I-K is an example of the silane that includes a silicon linked to three side chains that each include a poly(ethylene oxide) moiety.

Formula I-K:

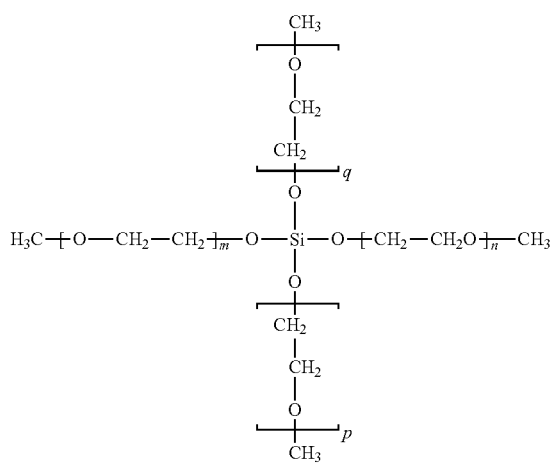

wherein m is 1 to 15, or ≧2; n is 1 to 15, or ≧2; p is 1 to 15, or ≧2; q is 1 to 15, or ≧2; and none, a portion or all of m, n, p and q can be different. Formula I-K illustrates each of the poly(alkylene) oxide moieties including an oxygen linked directly to the silicon, however, a spacer can link all or a portion of the poly(alkylene) oxide moieties to the silicon. For instance, Formula I-L is an example of the silane that includes a silicon linked to three side chains where one of the side chains includes a spacer linking a poly(alkylene oxide) moiety to the silicon and three of the side chains have poly (alylene oxide) moieties that include oxygens linked directly to the silicon.

Formula I-L:

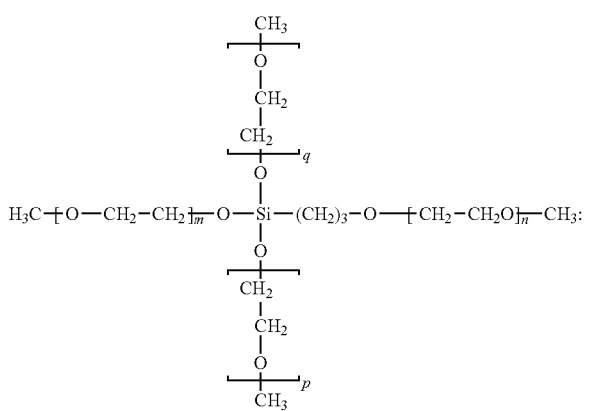

wherein m is 1 to 15, or ≧2; n is 1 to 15, or ≧2; p is 1 to 15, or ≧2; q is 1 to 15, or ≧2; and none, a portion, or all of m, n, p, and q can be different.

The silane can include one or more second substituents that are unsaturated. For instance, Formula I-M illustrates a silane with a silicon linked to an alkenyl group and to a side chain that includes a poly(ethylene oxide) moiety.

Formula I-M:

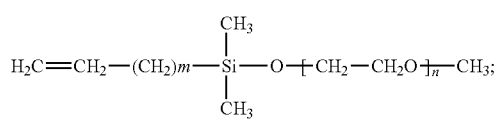

wherein m is 0 or greater than 0, and n is 1 to 15, or ≧2. Although the silane of Formula I-M is shown with a single side chain that includes a poly(ethylene oxide) moiety, the silane can include one or more side chain that each include a poly(ethylene oxide) moiety in place of the alkyl groups.

The silane can include one or more second substituents that are alkoxy groups. For instance, Formula I-N illustrates a silane with a silicon linked to two methoxy groups and to two side chains that includes a poly(ethylene oxide) moiety.

Formula I-N:

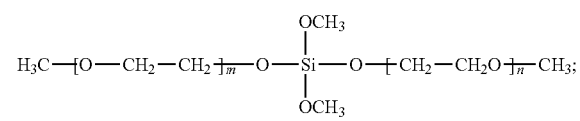

wherein m is 1 to 15, or ≧2; and n is 1 to 15, or ≧2; and m and n can be the same or different. Although the silane of Formula I-N is shown with two side chains that each includes a poly (ethylene oxide) moiety, the silane can include one side chain that includes a poly(ethylene oxide) moiety or more than two side chains that each include a poly(ethylene oxide) moiety.

The silane can be linked to one or more side chains that each include an aryl group and one or more side chains that each include a poly(ethylene oxide) moiety. For instance, Formula I-O illustrates a silane with a silicon linked to two side chains that each include a poly(ethylene oxide) moiety, and linked to an alkyl group, and linked to two side chains that include an aryl group.

Formula I-O:

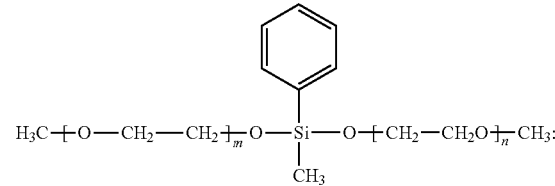

wherein m is 1 to 15, or ≧2; n is 1 to 15, or ≧2; and m can be different from n or the same as n. In a preferred silane according to Formula I-O, m=3 and n=3. Formula I-P illustrates a silane with a silicon linked to two side chains that each include a poly(ethylene oxide) moiety, and linked to two side chains that each include an aryl group.

Formula I-P

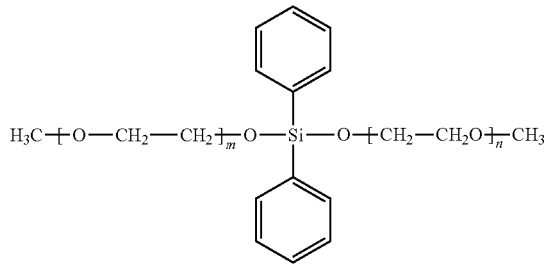

wherein m is 1 to 15, or ≧2; n is 1 to 15, or ≧2; and m can be different from n or the same as n. Formula I-Q illustrates a silane with a silicon linked to a side chain that includes a poly(ethylene oxide) moiety, linked to an alkyl group and linked to two aryl groups.

Formula I-Q

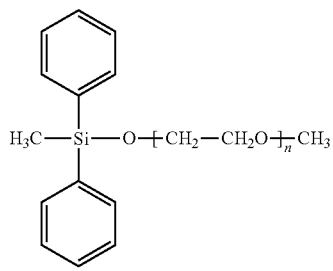

wherein n is 1 to 15, or ≧2.

Another preferred silane includes a silicon linked to one side chain that includes a cyclic carbonate moiety and linked to three second substituents. For instance, the silane can be represented by Formula I with x=0 and y=1. Formula I-R is a preferred example of the silane that includes a silicon linked to a side chain that includes a cyclic carbonate moiety and linked to three alkyl groups.

Formula I-R:

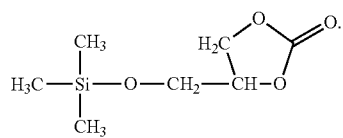

The silane can include a silicon linked to one or more side chains that each include a cyclic carbonate moiety and one or more side chains that each include a poly(alkylene oxide) moiety. For instance, the silane can be represented by Formula I with y=1, and x=1 and R' represented by Formula I-A. Formula I-S is an example of the silane that includes a silicon linked to a side chain that includes a cyclic carbonate moiety and to a side chain that includes a poly(alkylene oxide) moiety.

Formula I-S:

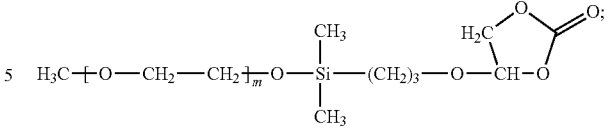

wherein m is 1 to 15, or ≧2.

Another preferred silane includes a silicon linked to a cross link that includes a poly(alkylene oxide) moiety and linked to three second substituents. For instance, the silane can be represented by Formula I with x=1, y=0 and the R' represented by Formula I-C. Formula I-T is a preferred example of the silane that includes a silicon linked to a cross link that includes a poly(alkylene oxide) moiety and linked to three alkyl groups. The poly(alkylene oxide) moiety of Formula I-T includes an oxygen liked directly to the silicon of each silane.

Formula I-T:

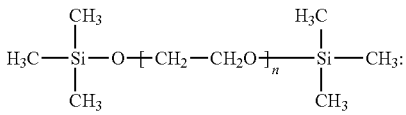

wherein n is 1 to 15, or ≧2. In a preferred silane according to Formula I-T, n=4.

The electrolyte can include a single silane. Alternately, the electrolyte can include a plurality of silanes. When the electrolyte includes a plurality of silanes, at least one of the silanes can be chosen from those represented by Formula I through Formula I-T. Alternately, each of the silanes can be chosen from those represented by Formula I through Formula I-T. In some instances, the electrolyte includes a silane that excludes poly(alkylene oxide) moieties and a silane that excludes cyclic carbonate moieties. For instance, the electrolyte can include a silane that includes one or more poly(alkylene oxide) moieties and a silane that excludes poly(alkylene oxide) moieties. Alternately, the electrolyte can include a silane that includes one or more cyclic carbonate moieties and a silane that excludes cyclic carbonate moieties. In a preferred example, the electrolyte includes a blend of a silane according to Formula I-R and a silane according to Formula I-F. In another preferred example, the electrolyte includes a blend of a silane according to Formula I-R and a silane according to Formula I-D.

In some instances, the electrolyte includes one or more siloxanes in addition to the one or more silanes. Examples of other suitable siloxanes include, but are not limited to, disiloxanes, trisiloxanes, tetrasiloxanes, pentasiloxanes, oligosiloxanes or polysiloxanes. Examples of suitable disiloxanes, trisiloxanes and tetrasiloxanes are disclosed in U.S. Provisional Patent application Ser. No. 60/543,951, filed on Feb. 11, 2004, entitled "Siloxanes;" and in U.S. Provisional Patent application Ser. No. 60/543,898, filed on Feb. 11, 2004, entitled "Siloxane Based Electrolytes for Use in Electrochemical Devices;" and in U.S. Provisional Patent application Ser. No. 60/542,017, filed on Feb. 4, 2004, entitled "Non-aqueous Electrolyte Solvents for Electrochemical Devices;" each of which is incorporated herein in its entirety. Suitable disiloxanes are disclosed in U.S. patent application Ser. No. 10/971,507, filed on Oct. 21, 2004, entitled "Electrochemical Device Having Electrolyte Including Disiloxane" and incorporated herein in its entirety. Suitable trisiloxanes are disclosed in U.S. patent application Ser. No. 10/971,913, filed on Oct. 21, 2004, entitled "Electrochemical Device Having Electrolyte Including Trisiloxane" and incorporated herein in its entirety. Suitable tetrasiloxanes are disclosed in U.S. patent application Ser. No. 10/971,926, filed on Oct. 21, 2004, entitled "Electrochemical Device Having Electrolyte Including Tetrasiloxane" and incorporated herein in its entirety. Examples of suitable electrolytes that include blends of silanes and siloxanes are disclosed in U.S. patent application Ser. No. 10/810,080; filed on Mar. 25, 2004; entitled "Electrolyte for Use in Electrochemical Devices" and incorporated herein in its entirety. When the solvent includes components in addition to the one or more primary silanes, the total concentration of the one or more primary silanes can optionally be greater than 0.1 wt %, 0.5 wt %, greater than 5 wt %, greater than 10 wt % of the solvent.

The electrolyte can also optionally include one or more secondary silanes in addition to the primary silanes disclosed above. The inventors believe that the secondary silanes improve the mobility of poly(alkylene oxide) in the electrolyte. Additionally, the combination of the primary silane and the secondary silane can increase the ability of the electrolyte to dissociate the salts employed in electrolyte and can accordingly increase the concentration of free ions in an electrolyte. These features can further enhance the ionic conductivity of the electrolytes.

Suitable secondary silanes for use in the electrolyte can be substituted. In some instances, the secondary silane includes four organic substituents. The secondary silane can include at least one substituent that includes a moiety selected from a first group consisting of an alkyl group, a halogenated alkyl group, an aryl group, a halogenated aryl group, an alkoxy group, a halogenated alkoxy group, an alkylene oxide group or a poly(alkylene oxide) and at least one substituent that includes a moiety selected from a second group consisting of an alkoxy group, a carbonate group, an alkylene oxide group and a poly(alkylene oxide) group. In some instances, the secondary silane includes four substituents that each includes a moiety selected from the first group or from the second group. The moieties in the first group and in the second group can be substituted or unsubstituted. In some instances, the secondary silane excludes both poly(alkylene oxide) moieties and cyclic carbonate moieties. In some instance, the secondary silane includes one or more substituents that include a halogenated moiety selected from the first group and the second group. Examples of suitable secondary silanes include, but are not limited to, aryltrialkoxysilanes or aryltrialkoxysilanes. For instance, the electrolyte can include one or more secondary silanes selected from the group consisting of: phenyltrimethoxysilane (PTMS), ethyltrimethoxysilane, pentafluorophenyltrimethoxylsilane, phenethyltris(trimethylsiloxy)silane. The one or more secondary silanes can be present in the solvent at a concentration greater than 0.5 wt %, greater than 5 wt %, greater than 10 wt %, and/or less than 40 wt %, or less than 20 wt %.

The secondary silanes can be represented by the following Formula III: $SiR_{4-z}R'_z$: where z is 1 to 3 and where R' is an alkyl, a halogenated alkyl, aryl, halogenated aryl, an alkoxy, a halogenated alkoxy or is represented by Formula III-D; R is an alkoxy, a halogenated alkoxy, or is represented by Formula or is represented by Formula z is the number of R' substituents included in the secondary silane and is 1 to 3, 4-z is the number of R substituents includes in the secondary silane. In instances where more than one substituent is represented by Formula the substituents can be the same or different. In instances where more than one substituent is represented by Formula the substituents represented by Formula can be the same or different.

Formula III-D:

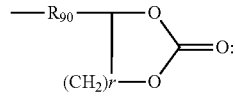

wherein $R_{90}$ is an organic spacer and r is 1 to 2. Suitable organic spacers can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{90}$ is a bivalent ether moiety represented by: —$CH_2$—O—$(CH_2)_3$— with the —$(CH_2)_3$— linked to the silicon. In another example, $R_{90}$ is a alkylene oxide moiety represented by: —$CH_2$—O— with the oxygen linked to the silicon.

Formula III-F:

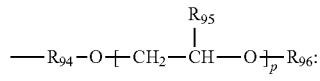

wherein $R_{94}$ is nil or an organic spacer; $R_{95}$ is hydrogen; alkyl or aryl; $R_{96}$ is alkyl or aryl; p is 1 to 12. Suitable organic spacers can include one or more —$CH_2$— groups. Other suitable spacers can include an alkylene, alkylene oxide or a bivalent ether group. These spacers can be substituted or unsubstituted. The above spacers can be completely or partially halogenated. For instance, the above spacers can be completely or partially fluorinated. In one example, $R_{94}$ is represented by: —$(CH_2)_3$—. One or more of the alkyl and aryl groups specified in Formula III through Formula III-F can be substituted, unsubstituted, halogenated, and/or fluorinated.

A preferred electrolyte includes at least one primary or secondary silane that excludes carbonate moieties and at least one primary silane or secondary silane that excludes poly(alkylene oxide) moieties. For instance, a preferred electrolyte can include at least one primary silane or secondary silane that includes one or more side chains that include a poly(alkylene oxide) moiety and at least one primary silane or secondary silane that excludes poly(alkylene oxide) moieties. Alternately, a preferred electrolyte can include at least one primary silane or secondary silane that includes one or more side chains that include a cyclic carbonate moiety and at least one primary silane or secondary silane that excludes cyclic carbonate moieties.

An example of a preferred solvent for use with the electrolyte includes or consists of one or more first siloxanes and/or one or more first silanes and one or more second siloxanes and/or one or more second silanes. Each of the first siloxanes and/or first silanes have one or more first substituents that each include a poly(alkylene oxide) moiety. Each of the second siloxanes and/or second silanes have one or more second substituents that each include a cyclic carbonate moiety. In one example, the solvent includes a first silane having a substituent with a poly(alkylene oxide) moiety and a second silane having a substituent with the cyclic carbonate moiety.

In some instances, the solvent includes one or more organic solvents in addition to one or more of the silanes and/or in addition to one or more of the siloxanes. Organic solvents can reduce the viscosity of the siloxanes and/or the silanes. Additionally or alternately, the addition of organic solvents can increase the ionic conductivity of the electrolyte. Preferred organic solvents include cyclic carbonates such as propylene carbonate (PC), ethylene carbonate (EC), butylene carbonate (BC) and vinylene carbonate (VC). Examples of suitable organic solvents include, but are not limited to, linear carbonates such as dimethyl carbonate (DMC), diethyl carbonate (DEC), ethylmethyl carbonate (EMC) and dipropyl carbonate (DPC), dialkyl carbonates such as diglyme, trigylme, tetragylme, 1,2-dimethoxyethane (DME), methyl propyl carbonate, ethyl propyl carbonate, aliphatic carboxylate esters such as methyl formate, methyl acetate and ethyl propionate, gamma.-lactones such as .gamma.-butyrolactone, linear ethers such as 1,2-ethoxyethane (DEE) and ethoxymethoxyethane (EME), cyclic ethers such as tetrahydrofuran and 2-methyltetrahydrofuran, and aprotic organic solvents such as dimethylsulfoxide, 1,3-dioxolane, formamide, acetoamide, dimethylformamide, dioxolane, acetonitrile, propylnitrile, nitromethane, ethylmonoglyme, triester phosphate, timethoxymethane, dioxolane-derivatives, sulphorane, methylsulphorane, 1,3-diemthyl-2-imidazoline, 3-methyl-2-oxazolidinone, propylene carbonate-derivatives, tetrahydrofuran-derivatives, ethylether, 1,3-propanesultone, anisole, N-methylpyrrolidone and fluorinated carboxylate esters. In some instances, the solvent excludes organic solvents. When the solvent includes one or more organic solvents, a suitable volume ratio of the total organic solvents to the total siloxane and silane is greater than 1:99, 1:9, or 3:7 and/or less than 9:1, 4:1 or 7:3.

In some instances, the solvent includes one or more additives. Additives can serve a variety of different functions. For instance, additives can enhance the ionic conductivity and/or enhance the voltage stability of the electrolyte. A preferred additive forms a passivation layer on one or more electrodes in an electrochemical device such as a battery or a capacitor. The passivation layer can enhance the cycling capabilities of the electrochemical device. In one example, the passivation layer is formed by reduction of the additive at the surface of an electrode that includes carbon. In another example, the additive forms a polymer on the surface of an electrode that includes carbon. The polymer layer can serve as the passivation layer.

Vinyl ethylene carbonate (VEC) and vinyl carbonate (VC) are examples of additives that can form a passivation layer by being reduced and polymerizing to form a passivation layer. When they see an electron at the surface of a carbonaceous anode, they are reduced to $Li_2CO_3$ and butadiene that polymerizes at the surface of the anode. Ethylene sulfite (ES) and propylene sulfite (PS) form passivation layers by mechanisms that are similar to VC and VEC. In some instances, one or more of the additives has a reduction potential that exceeds the reduction potential of the components of the electrolyte solvent. For instance, VEC and VC have a reduction potential of about 2.3V. This arrangement of reduction potentials can encourage the additive to form the passivation layer before reduction of other electrolyte solvent components and can accordingly reduce consumption of other electrolyte components.

Suitable additives include, but are not limited to, carbonates having one or more unsaturated substituents. For instance, suitable additives include unsaturated and unsubstituted cyclic carbonates such as vinyl carbonate (VC); cyclic alkylene carbonates having one or more unsaturated substituents such as vinyl ethylene carbonate (VEC), and o-phenylene carbonate (CC, $C_7H_4O_3$); cyclic alkylene carbonates having one or more halogenated alkyl substituents such as ethylene carbonate substituted with a trifluormethyl group (trifluoropropylene carbonate, TFPC); linear carbonates having one or more unsaturated substituents such as ethyl 2-propenyl ethyl carbonate ($C_2H_5CO_3C_3H_5$); saturated or unsaturated halogenated cyclic alkylene carbonates such as fluoroethylene carbonate (FEC) and chloroethylene carbonate (ClEC). Other suitable additives include, acetates having one or more unsaturated substituents such as vinyl acetate (VA). Other suitable additives include cyclic alkyl sulfites and linear sulfites. For instance, suitable additives include unsubstituted cyclic alkyl sulfites such as ethylene sulfite (ES); substituted cyclic alkylene sulfites such as ethylene sulfite substituted with an alkyl group such as a methyl group (propylene sulfite, PS); linear sulfites having one or more one more alkyl substituents and dialkyl sulfites such as dimethyl sulfite (DMS) and diethyl sulfite (DES). Other suitable additives include halogenated-gamma-butyrolactones such as bromo-gamma-butyrolactone (BrGBL) and fluoro-gamma-butyrolactone (FGBL).

The additives can include or consist of one or more additives selected from the group consisting of: dimethyl sulfite (DMS), diethyl sulfite (DES), bromo-gamma-butyrolactone (BrGBL), fluoro-gamma-butyrolactone (FGBL), vinyl carbonate (VC), vinyl ethylene carbonate (VEC), ethylene sulfite (ES), o-phenylene carbonate (CC), trifluoropropylene carbonate (TFPC), 2-propenyl ethyl carbonate, fluoroethylene carbonate (FEC), chloroethylene carbonate (ClEC), vinyl acetate (VA), propylene sulfite (PS), 1,3 dimethyl butadiene, styrene carbonate, phenyl ethylene carbonate (PhEC), aromatic carbonates, vinyl pyrrole, vinyl piperazine, vinyl piperidine, vinyl pyridine, and mixtures thereof. In another example, the electrolyte includes or consists of one or more additives selected from the group consisting of vinyl carbonate (VC), vinyl ethylene carbonate (VEC), ethylene sulfite (ES), propylene sulfite (PS), and phenyl ethylene carbonate (PhEC). In a preferred example, the electrolyte includes or consists of one or more additives selected from the group consisting of vinyl carbonate (VC), vinyl ethylene carbonate (VEC), ethylene sulfite (ES), and propylene sulfite (PS). In another preferred example, the electrolyte includes vinyl carbonate (VC) and/or vinyl ethylene carbonate (VEC).

In some conditions, certain organoborate salts, such as LiDfOB, can form a passivation layer. As a result, the desirability and/or concentration of additives may be reduced when organoborates are employed as salts. In some instances, the concentration of additives in the electrolyte generally does not greatly exceed the concentration needed to form the passivation layer. A suitable concentration for an additive in the solvent includes, but is not limited to, concentrations greater than 0.1 wt %, greater than 0.5 wt % and/or less than 5 wt %, less than 20 wt %, or less than 35 wt % where each of the wt % refers to the percentage of the electrolyte solvent. In a preferred embodiment, the concentration of the additive is less than 3 wt % or less than 2 wt %.

An electrolyte can be generated by dissolving one or more salts in one or more of the primary silanes disclosed above. In instances where the solvent includes components in addition to the one or more silanes, such as additives, organic solvents, secondary silanes and/or siloxanes, one or more of the salts can be dissolved in another component(s) before the other component(s) are combined with the one or more silanes. The electrolyte can be prepared such that the concentration of the salt in the electrolytes is about 0.3 to 2.0 M, about 0.5 to 1.5 M, or about 0.7 to 1.2 M.

Suitable salts for use with the electrolyte include, but are not limited to, alkali metal salts including lithium salts. Examples of lithium salts include $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates, organoborate salts and mixtures thereof. A preferred salt for use with the electrolyte include organoborate salts such as lithium bis(chelato)borates including lithium bis(oxalato)borate (LiBOB) and lithium difluoro oxalato borate (LiDfOB). Examples of suitable organoborate salts are disclosed in U.S. Patent Application Ser. No. 60/565,211, filed on Apr. 22, 2004, entitled "Organoborate Salt in Electrochemical Device Electrolytes" and incorporated herein in its entirety.

When a lithium salt is used with the electrolyte, an [EO]/[Li] ratio can be used to characterize the salt in the electrolyte. [EO] is the molar concentration in the electrolyte of the ethylene oxides in the one or more primary silanes. In some instances, spacers and/or secondary silanes will also include active oxygens that contribute to the [EO]. The electrolyte is preferably prepared so as to have a [EO]/[Li] ratio of 5 to 50. When the [EO]/[Li] ratio is larger than 50, the ionic conductivity of the resulting electrolyte can become undesirably low because few carrier ions are in the electrolyte. When the [EO]/[Li] ratio is smaller than 5, the lithium salt may not sufficiently dissociate in the resulting electrolyte and the aggregation of lithium ions can confine the ionic conductivity.

In some instances, an organoborate salt is used as an additive and one or more non-organoborate salts are used as a salt. For instance, an organoborate salt can be present in a concentration that does not greatly exceed the concentration needed to form the passivation layer while the one or more non-organoborate salts are present at the higher salt concentrations. This arrangement permits the electrolyte to have the advantages of the passivation layer formation provided by organoborate salts while retaining advantages offered by non-organoborate salts. Suitable concentration for an organoborate additive in the solvent before discharge of the battery in the electrolyte includes, but is not limited to, concentrations greater than 0.005, greater than 0.001 M and/or less than 0.05 M, less than 0.2 M or less than 1.0 M. In a preferred embodiment, before discharge of the battery at least one organoborate additive is present in the solvent at a concentration of less than 0.1 M. Before discharge of the battery or before formation of the passivation layer, a suitable molar ratio of the total concentration of the non-organoborate salts in the solvent: total organoborate additive concentration in the solvent includes ratios greater than 4:1, 10:1, 40:1, or 200:1 and/or less than 50:1, 100:1, 400:1 or 800:1. In some instances, the molar ratio is in a range of 50:1 to 200:1.

A preferred embodiment of the electrolyte includes or consists of: one or more of the primary silanes and an organoborate salt. Another preferred embodiment of the electrolyte includes or consists of: one or more of the primary silanes and lithium(oxalato)borate (LiBOB). Another preferred embodiment of the electrolyte includes or consists of: one or more of the primary silanes and lithium difluoro oxalato borate (LiDfOB) salt. Another preferred embodiment of the electrolyte includes or consists of: one or more of the primary silanes, one or more of the secondary silanes and an organoborate salt. Another preferred embodiment of the electrolyte includes or consists of: one or more of the primary silanes and one or more of the secondary silanes, and lithium difluoro oxalato borate (LiDfOB) salt. Another preferred embodiment of the electrolyte includes or consists of: one or more of the primary silanes, one or more of the secondary silanes, and lithium difluoro oxalato borate (LiDfOB) salt.

A preferred embodiment of the electrolyte includes or consists of: one or more of the primary silanes, $LiPF_6$, and one or more additives selected from a group consisting of VC and VEC. Another preferred embodiment of the electrolyte includes or consists of: one or more of the primary silanes, one or more of the secondary silanes, $LiPF_6$, and one or more additives selected from a group consisting of VC and VEC.

The electrolyte can include a network polymer that forms an interpenetrating network with a component in the solvent. For instance, the electrolyte can include a network polymer that forms an interpenetrating network with one or more of the silanes. An electrolyte having an interpenetrating network can be generated by polymerizing and/or cross-linking one or more network polymers in the presence of the one or more primary silanes.

Suitable network monomers from which the network polymer can be formed include, but are not limited to, acrylates and methacrylates. Acrylates and/or methacrylates having one or more functionalities can homopolymerize to form a polyacrylate and/or a polymethacrylate network polymer. Acrylates and/or methacrylates having two or more functionalities can both polymerize and cross-link to form a cross-linked polyacrylate network polymer and/or to form a cross-linked polymethacrylate network polymer. In some instances, acrylates and/or methacrylates having four or more functionalities are a preferred network monomer. Suitable acrylates include, but are not limited to, poly(alkylene glycol) dialkyl acrylate. Suitable methacrylates include, but are not limited to, poly(alkylene glycol) dialkyl methacrylate.

A suitable network monomer is represented by the following

Formula IV:

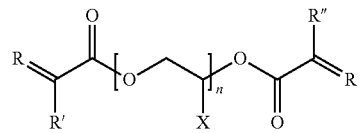

wherein: R is represented by $=CR'''R''''$ and each can be the same or different; R' represents hydrogen or a group selected from an alkyl group having 1 to 10 carbon atoms and/or an alkenyl group having 2 to 12 carbon atoms; R" represents hydrogen or a group selected from an alkyl group having 1 to 10 carbon atoms or an alkenyl group having 2 to 12 carbon atoms; R''' represents hydrogen or a group selected from an alkyl group having 1 to 10 carbon atoms; R'''' represents hydrogen or a group selected from an alkyl group having 1 to 10 carbon atoms; X is hydrogen or a methyl group; and n represents a numeral of 1 to 15.

When a monomer that cross-links is employed to form a cross-linked network polymer, a control monomer can be employed to control cross-linking density. A suitable control monomer for use with a network monomer according to Formula IV is represented by the following Formula V:

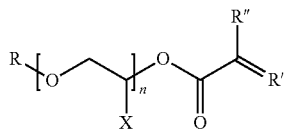

wherein: R is represented by =CR'''R''''; R' is an alkyl group having 1 to 10 carbon atoms; R'' is hydrogen or a group selected from an alkyl group having 1 to 10 carbon atoms or an alkenyl group having 2 to 12 carbon atoms; R''' represents hydrogen or a group selected from an alkyl group having 1 to 10 carbon atoms; R'''' represents hydrogen or a group selected from an alkyl group having 1 to 10 carbon atoms; X is hydrogen or a methyl group; and n represents a whole number from 1 to 20. During formation of the network polymer, the illustrated control monomer serves as a co-monomer with the network monomers according to Formula IV. Because the control monomer does not cross link, increasing the amount of control monomer present during formation of the network polymer can reduce the density of cross-linking.

Diallyl terminated compounds can also be employed as a network monomer. Diallyl terminated compounds having two or more functionalities can polymerize and cross-link to form the network polymer. An example of a diallyl-terminated compound having two functionalities that allow the compound to polymerize and cross-link is represented by Formula VI.

Formula VI:

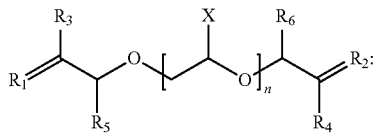

wherein $R_1$ is represented by =CR'''R'''', $R_2$ is represented by =CR'''R''''; $R_3$ represents hydrogen or a group selected from an alkyl group having 1 to 10 carbon atoms or an alkenyl group having 2 to 12 carbon atoms; $R_4$ represents hydrogen or a group selected from an alkyl group having 1 to 10 carbon atoms or an alkenyl group having 2 to 12 carbon atoms; $R_5$ represents hydrogen or a group selected from an alkyl group having 1 to 10 carbon atoms or an alkenyl group having 2 to 12 carbon atoms; $R_6$ represents hydrogen or a group selected from an alkyl group having 1 to 10 carbon atoms or an alkenyl group having 2 to 12 carbon atoms; R''' represents hydrogen or a group selected from an alkyl group having 1 to 10 carbon atoms; R'''' represents hydrogen or a group selected from an alkyl group having 1 to 10 carbon atoms; X is hydrogen or a methyl group; and n represents a numeral of 1 to 15.

Formula VIII represents an example of a control monomer for controlling the cross linking density of a compound represented by Formula VI.

Formula VIII:

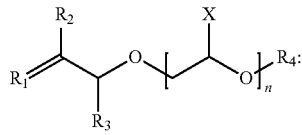

wherein $R_1$ is represented by =CR'''R''', $R_2$ represents hydrogen or a group selected from an alkyl group having 1 to 10 carbon atoms or an alkenyl group having 2 to 12 carbon atoms; $R_3$ represents hydrogen or a group selected from an alkyl group having 1 to 10 carbon atoms or an alkenyl group having 2 to 12 carbon atoms; $R_4$ represents hydrogen or a group selected from an alkyl group having 1 to 10 carbon atoms or an alkenyl group having 2 to 12 carbon atoms; R' represents hydrogen or a group selected from an alkyl group having 1 to 10 carbon atoms; R'''' represents hydrogen or a group selected from an alkyl group having 1 to 10 carbon atoms; X is hydrogen or a methyl group; and n represents a numeral of 1 to 15.

A diallyl-terminated compound suitable for serving as a network monomer can include more than two functionalities. For instance, the oxygens shown in Formula IV can be replaced with $CH_2$ groups to provide a diallyl-terminated compound having four functionalities that allow the compound to polymerize and cross-link. Further, the carbonyl groups shown in Formula IV can be replaced with allyl groups to provide an example of a control monomer for controlling the cross linking density of the terminated-terminated compound. Other suitable diallyl-terminated compounds for serving as a network monomer include, but are not limited to, poly(alkylene glycol) diallyl ether. A specific examples includes, but is not limited to, tetra(ethylene glycol) diallyl ether.

An electrolyte that includes an interpenetrating network can be formed by generating a precursor solution that includes the one or more primary silanes, the monomers for forming the cross-linked network polymer and one or more of the salts. The precursor solution can also optionally be generated so as to include one or more radical initiators. The precursor solution can also be optionally also generated so as to include one or more of the other electrolyte components. Suitable radical initiators include, but are not limited to, thermal initiators including azo compounds such as azoisobutyronitrile, peroxide compounds such as benzoylperoxide, and bismaleimide. A control monomer can also optionally be added to the precursor solution to control the cross-linking density of the network monomer. The monomers are cross-linked and/or polymerized to form the electrolyte. In some instance, the temperature of the precursor solution is elevated and/or the precursor solution is exposed to UV to form the electrolyte. The resulting electrolyte can be a liquid, solid or gel. The physical state of the electrolyte can depend on the ratio of the components in the precursor solution.

In an electrolyte formed using the monomers represented by Formula IV, the network polymer is formed from a monomer that homopolymerizes and cross-links. Alternately, an electrolyte having an interpenetrating network can be generated from a polymer and a cross-linking agent for cross-linking of the polymer. For instance, a diallyl terminated compound can serve as a cross linking agent for a polysiloxane having a backbone that includes one or more silicons linked to a hydrogen. Examples of suitable diallyl terminated cross-linking agents include, but are not limited to, diallyl-terminated siloxanes, diallyl terminated polysiloxanes, diallyl terminated alkylene glycols and diallyl terminated poly(alkylene glycol)s.

The electrolyte can be generated by preparing a precursor solution that includes the polymer, the cross linking agent, the one or more primary silanes and one or more salts. The precursor solution can also optionally be generated so as to include one or more catalysts. The precursor solution can also optionally be generated so as to include one or more of the other electrolyte components. Suitable catalysts include, but are not limited to, platinum catalysts such as Karlstedt's catalyst and $H_2PtCl_6$. In some instances, an inhibitor is added to the precursor solution to slow the cross-linking reaction enough to permit handling prior to viscosity changing. Suitable inhibitors include, but are not limited to, dibutyl maleate. The polymer is cross-linked to form the electrolyte. In some instances, heat and/or UV energy is also applied to the precursor solution during the reaction of the cross linking precursor and the cross-linking agent.

A network polymer suitable for the interpenetrating network can be formed using other precursors. For instance, the network polymer can be generated from a mixture of monomers and cross-linking agents that are different from one another. The monomers can polymerize and the cross-linking agents can provide cross-linking of the resulting polymer. In another example, monomers that heteropolymerize are employed to generate the network polymer. Other examples of methods for generating electrolytes and electrochemical devices that include network polymers are described in U.S. patent application Ser. No. 10/104,352, filed on Mar. 22, 2002, entitled "Solid Polymer Electrolyte and Method of Preparation" and incorporated herein by reference in its entirety.

As noted above, the electrolyte can include one or more solid polymers in addition to the solvent. The solid polymers are each a solid when standing alone at room temperature. As a result, the ratio of solid polymer to the other electrolyte components can be selected so as to provide an electrolyte that is a solid at room temperature. A suitable solid polymer is an aprotic polar polymer or aprotic rubbery polymer. Examples of suitable solid polymers include, but are not limited to, polyacrylonitrile (PAN), poly(methyl methacrylate) (PMMA), poly(vinylidene fluoride) (PVDF), poly(vinylidene fluoride-co-hexafluoropropylene), polystyrene, polyvinyl chloride, poly(alkyl methacrylate), poly(alkyl acrylate), styrene butadiene rubber (SBR), poly(vinyl acetate), poly(ethylene oxide) (PEO) and mixtures thereof.

The electrolyte can be generated by preparing a precursor solution by combining one or more primary silanes and a solution that includes a solid polymer. The solution that includes the solid polymer can be generated by dissolving the solid polymer in a solvent such as N-methyl-2-pyrrolidone (NMP), dimethyl formamide, dimethyl acetamide, tetrahydrofuran, acetonitrile, and/or water. The precursor solution can optionally be prepared so as to include additional electrolyte components, such as one or more additives and/or one or more organic solvents and/or one or more siloxanes and/or one or more secondary silanes. One or more salts can be added to the precursor solution or the salt can be dissolved in a component of the precursor solution before adding the component to the precursor solution. A solid electrolyte can be formed by evaporating the solvent from the precursor solution.

An electrolyte that includes one or more solid polymers can also be generated by polymerizing a solid polymer in the presence of one or more primary silanes. For instance, a precursor solution can be generated so as to include one or more primary silanes, monomers for the solid polymer and a radical initiator. Suitable radical initiators include, but are not limited to, thermal initiators including azo compounds such as azoisobutyronitrile, peroxide compounds such as benzoylperoxide, and bismaleimide. The precursor solution can optionally be prepared so as to include additional electrolyte components, such as one or more additives and/or one or more organic solvents and/or one or more siloxanes and/or one or more secondary silanes. One or more salts can be added to the precursor solution or the salt can be dissolved in a component of the precursor solution before adding the component to the precursor solution. The electrolyte can be formed by polymerizing the monomers. As an example, acrylonitrile monomers can be mixed with one or more primary silanes. The acrylonitrile monomers can be polymerized by the application of heat and/or UV to form an electrolyte having a polyacrylonitrile solid polymer.

As evident from the above discussion, the electrolyte can include a variety of components such as silane(s), siloxanes, secondary silanes, additives, organic solvents, network polymers and/or solids polymers. One or more components of the electrolyte can be exposed to a zeolite to further purify the component. For instance, the silane(s) and/or siloxane(s) can be exposed to a zeolite to further purify the silane(s) and/or siloxane(s). It is believed that a zeolite can reduce impurities such as water, a variety of organic impurities and oxalate derivatives. The organic impurities are believed to include more hydrocarbon(s), one or more alcohol(s), and organic acid(s) such as oxalic acid. The organic impurities and water may be residual materials from the synthesis and processing of the silane(s) and/or siloxanes. When more than one electrolyte component is exposed to the zeolite, all or a portion of the components that are to be exposed can be mixed and then exposed to the zeolite, or the components can be independently exposed to a zeolite before mixing of the components, or different combinations of components can be independently exposed to a zeolite before mixing of the components. In one example, the electrolyte is generated and then the electrolyte is exposed to the zeolite. In most instances, the zeolite and component(s) are separated after exposure of the component(s) to the zeolite. The use of zeolites in conjunction with silanes is disclosed in U.S. Patent Application Ser. No. (Not Yet Assigned), filed on Feb. 8, 2005, entitled "Reduction of Impurities in Battery Electrolyte, and incorporated herein in its entirety."

As evident from the above discussion, the solvent can include components in addition to the one or more primary silanes. For instance, the solvent can include siloxanes, salts, secondary silanes, additives, and/or organic solvents. In some instances, the electrolyte is generated such that the one or more primary silanes are more than 20 wt % of the solvent, more than 50 wt % of the solvent, more than 80 wt % of the solvent or more than 95 wt % of the solvent. In some instances, the electrolyte consists of one or more primary silanes and one or more salts.

The silanes can be generated by employing a hydrosilylation reaction with a precursor silane and side chain precursors. The precursor silane has one or more hydrogens linked to the silicon(s) where the side chains are desired. The side chain precursor is allyl terminated. The side chain precursors also include a poly(alkylene oxide) moiety or a carbonate moiety. For the purposes of illustration, FIG. 1A illustrates a hydrosilylation reaction employed to generate a silane having one or more side chains that include a poly(ethylene oxide) moiety and/or one or more side chains that includes a carbonate moiety. A precursor silane having a silicon linked to a hydrogen is labeled A. An allyl terminated side chain precursor that includes a poly(ethylene oxide) moiety is labeled B and an allyl terminated side chain precursor that includes a cyclic carbonate moiety is labeled C. Although the precursor silane is illustrated as having a single silicon linked to a hydrogen, when two side chains are to be added to a precursor silane, the precursor silane can include two or more hydrogens linked to the silicon in the precursor silane.

When the desired silane has one or more side chains that include a poly(ethylene oxide) moiety, a precursor solution is generated that includes the precursor silane and the side chain precursor labeled B. When the desired silane has one or more side chains that include a carbonate moiety, a precursor solution is generated that includes the precursor silane and the side chain precursor labeled C. When the desired silane has one or more side chains that include a poly(ethylene oxide) moiety and one or more side chains that include a carbonate moiety, a precursor solution is generated that includes the side chain precursor labeled B, the side chain precursor labeled C, and a precursor silanes with at least two hydrogens linked to the same silicon or linked to different silicons.

In some instances, a reaction solvent is added to the precursor solution of FIG. 1. A suitable solvent includes, but is not limited to, toluene, THF, and benzene. A catalyst can be added to the precursor solution to catalyze the hydrosilylation reaction. Suitable catalysts for use in the precursor solution include, but are not limited to, platinum catalysts such as Karstedt's catalyst (divinyltetramethyldisiloxane (Pt(dvs)), dicyclopentadiene platinum(II) dichloride, $H_2PtCl_6$. In some instances, heat is applied to the precursor solution to react the components of the precursor solution. The reaction can be continued until the Si—H groups are no longer evident on an FTIR spectrum. The product solution can be distilled to remove any unreacted side-chain precursors and/or reaction solvent. In some instances, the product is decolorized and/or purified by distillation. The product can be decolorized by activated charcoal in refluxing toluene. The product can be purified by distillation using a long vacuum jacketed Vigreux column and/or by sequentially performing two or more regular distillations. The regular distillations can be vacuum distillations. When a sequence of two or more regular distillations is performed, a central fraction of the distillate can be used as the product for each distillation step.

Figure 1B:
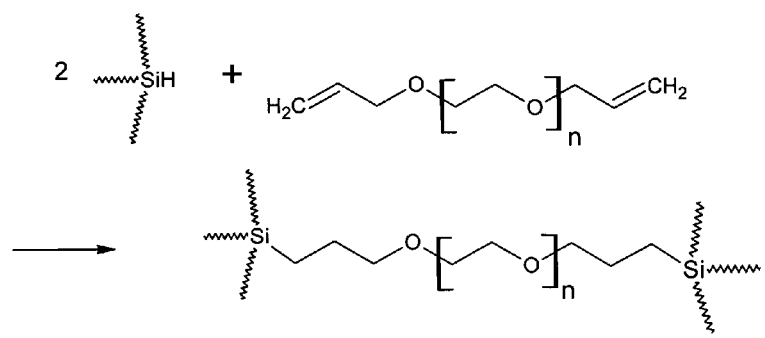
FIG. 1B illustrates a hydrosilylation reaction suitable for generating a silane having a cross link to a second silane.

The hydrosilylation reaction can be adapted to generate silanes that include a cross link to a second silane. For instance, the hydrosilylation reaction can be employed by substituting a diallyl-terminated cross-link precursor for the side chain precursor. As an example, FIG. 1B illustrates a diallyl-terminated cross-link precursor substituted for the side chain precursor of FIG. 1B. Each terminus of the cross-link precursor links to a silicon on a different precursor silane. When the desired silane is to have one or more of the side chains and a cross link to another silane, a siloxane precursor having a backbone linked to hydrogens can be employed. A precursor solution can be generated that includes the desired side chain precursor(s) and the cross-link precursor. For instance, a silane having a side chain with a poly(alkylene oxide) moiety and a cross link can be generated from a precursor silane having silicon linked to a plurality of hydrogens. The precursor silane can be employed in a precursor solution that includes the precursor siloxane, a cross link precursor, and a side chain precursor.

As is evident from FIG. 1A, the hydrosilylation reaction is suitable for generating a silane having a side chain with a spacer between a silicon and a poly(alkylene oxide) moiety or a between a silicon and a carbonate moiety. In some instances, the silanes can be generated by employing a dehydrogenation reaction as disclosed in U.S. patent application Ser. No. 10/971,507, filed on Oct. 21, 2004, entitled "Electrochemical Device Having Electrolyte Including Disiloxane." A dehydrogenation reaction may be suitable for generating a siloxane having a silicon that is directly linked to an oxygen included in a poly(alkylene oxide) moiety.

The silanes can be generated by employing a nucleophilic substitution with a precursor silane and primary substituent precursors. The precursor silane is halogenated. For instance, the precursor silane can include a silicon linked to a substituent that includes a halogen. For instance, the precursor silane can be linked directly to a halogen or the silicon can be linked directly to a halogenated substituent that serves as a secondary substituent precursor. A suitable structure for the second substituent precursor includes, but is not limited to: —R-Halogen, wherein R is an organic moiety such as an alkyl group. Suitable halogens include fluorine, bromine and iodine. The primary substituent precursors can be a salt of an alcohol that includes a poly(alkylene oxide) moiety, an alcohol that includes a poly(alkylene oxide) moiety, a salt of an alcohol that includes a cyclic carbonate moiety or an alcohol that includes a cyclic carbonate moiety. When the precursor silane includes a halogenated second substituent precursor, a portion of the secondary substituent precursor and a portion of the primary substituent precursor combine to form the first substituent on the primary silane.

Figure 2A:
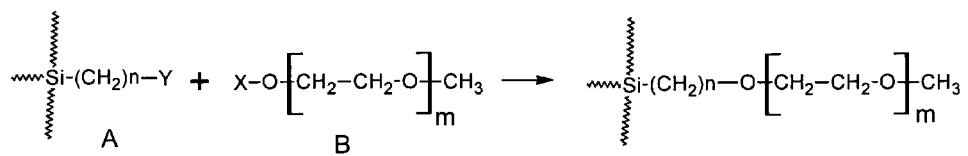
FIG. 2A illustrates a nucleophilic substitution employed to generate a silane having one or more side chains that include a poly(ethylene oxide) moiety.

FIG. 2A illustrates a nucleophilic substitution employed to generate a primary silane having one or more side chains that include a poly(ethylene oxide) moiety. A primary substituent precursor is labeled B: wherein suitable X include, but are not limited to, —H, —Li, —Na or —K. A precursor silane, labeled A, is linked to a substituent labeled —$(CH_2)_n$Y where n is 0 or greater than 0 and Y is a halogen. When n is 0, the silicon is linked to the halogen (Y). When n is greater than 0, the silicon is linked to a secondary substituent precursor represented by —$(CH_2)_n$Y. When X is —H, the method becomes more effective as the value of n increases. For instance, X can be —H when n is greater than 2 or 3. When the desired primary silane has one or more side chains that include a poly(ethylene oxide) moiety, a precursor solution is generated that includes the precursor silane and the primary substituent precursor. As is evident from FIG. 2A, when n is 0, the nucleophilic substitution is suitable for generating a primary silane having a side chain with a poly(alkylene oxide) that includes an oxygen linked directly to the silicon. When n is greater than 0, the nucleophilic substitution is suitable for generating a primary silane having a side chain with a spacer positioned between a poly(alkylene oxide) moiety and the silicon.

Figure 2B:
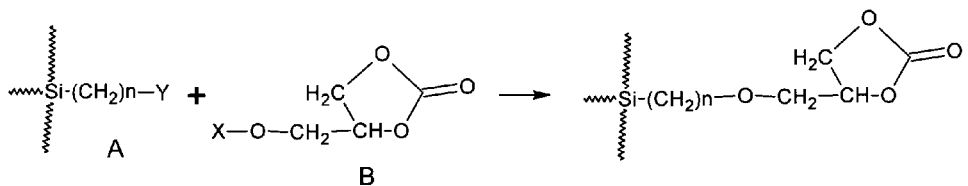
FIG. 2B illustrates a nucleophilic substitution employed to generate a silane having one or more side chains that include a cyclic carbonate moiety.

FIG. 2B illustrates a nucleophilic substitution employed to generate a primary silane having one or more side chains that include a cyclic carbonate moiety. A primary substituent precursor is labeled B: wherein suitable X include, but are not limited to, —H, —Li, —Na or —K. A precursor silane, labeled A, is linked to a substituent labeled —$(CH_2)_n$Y where n is 0 or greater than 0 and Y is a halogen. When n is 0, the silicon is linked directly to the halogen (Y). When n is greater than 0, the silicon is linked to a secondary substituent precursor represented by —$(CH_2)_n$Y. When X is —H, the method becomes more effective as the value of n increases. For instance, X can be —H when n is greater than 3. When the desired primary silane has one or more side chains that include a cyclic carbonate moiety, a precursor solution is generated that includes the precursor silane and the primary substituent precursor. As is evident from FIG. 2B, when n is 0, the nucleophilic substitution is suitable for generating a primary silane having a side chain with a poly(alkylene oxide) that includes an oxygen linked directly to the silicon. When n is greater than 0, the nucleophilic substitution is suitable for generating a primary silane having a side chain with a spacer positioned between a poly(alkylene oxide) moiety and the silicon.

Figure 2C:
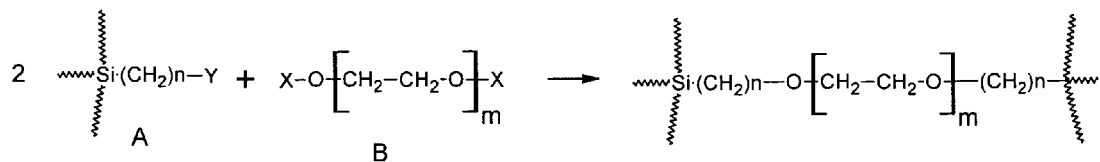
FIG. 2C illustrates a nucleophilic substitution employed to generate a silane having a cross link to another silane.

FIG. 2C illustrates a nucleophilic substitution employed to generate a primary silane having a cross link to another silane. A primary substituent precursor is labeled B: wherein suitable X include, but are not limited to, —H, —Li, —Na or —K. A precursor silane, labeled A, is linked to a substituent labeled —$(CH_2)_n$Y where n is 0 or greater than 0 and Y is a halogen. When n is 0, the silicon is linked to the halogen (Y). When n is greater than 0, the silicon is linked to a secondary substituent precursor represented by —$(CH_2)_n$Y. When X is —H, the method becomes more effective as the value of n increases. For instance, X can be —H when n is greater than 3. When the desired primary silane has one or more cross links that include a poly(ethylene oxide) moiety, a precursor solution is generated that includes the precursor silane and the primary substituent precursor. As is evident from FIG. 2C, when n is 0, the nucleophilic substitution is suitable for generating a primary silane having a cross link with a poly(alkylene oxide) that includes an oxygen linked directly to the silicon. When n is greater than 0, the nucleophilic substitution is suitable for generating a primary silane with a cross link having a spacer positioned between a poly(alkylene oxide) moiety and the silicon.

The methods illustrated in FIG. 2A through FIG. 2C can be employed to attach an alkoxy group to the silane precursor. For instance, the method of FIG. 2A can be employed with an —OH terminated alkyl group or an alcohol substituted for the primary substituent precursor. Additionally or alternately, in some instances, the above methods can be employed with a silane precursor that includes an unsaturated side chain.

Figure 2D:
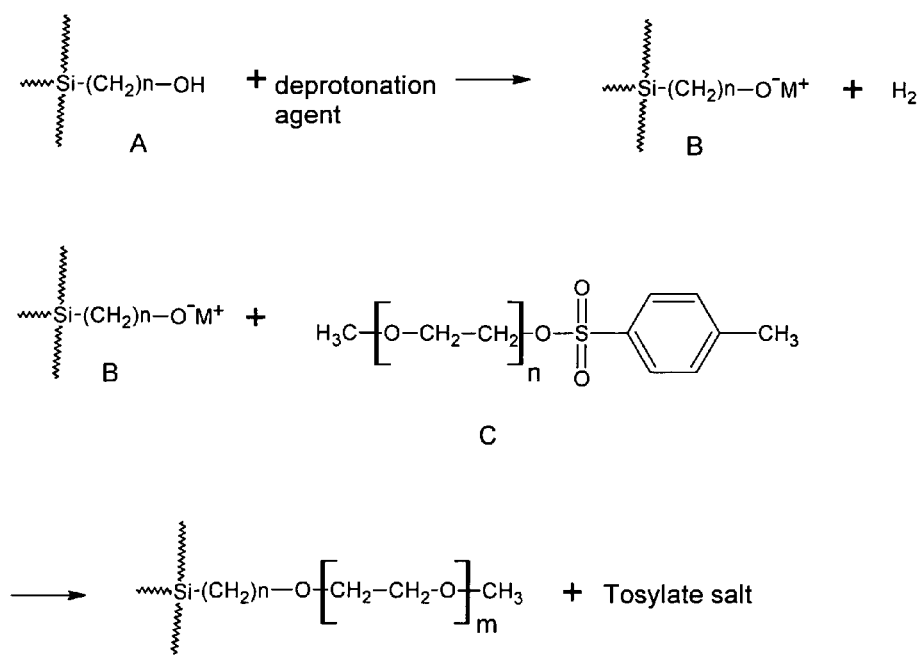
FIG. 2D illustrates a method of forming a silane having a side chain that includes a spacer positioned between a poly(ethylene oxide) moiety and the silicon.

In some instances, the methods illustrated in FIG. 2A through FIG. 2C become less effective as the value of n decreases. An alternate method for forming the silanes employs the precursor silane of FIG. 2A through FIG. 2C with Y as —OH. A deprotonation agent is then employed to convert precursor silane to a silane salt. The silane salt is then reacted with a tosylate that includes a poly(alkylene oxide) moiety or that includes a carbonate moiety so as to produce the product silane and a tosylate salt. FIG. 2D illustrates an example of this method employed to generate a primary silane having one or more side chains that include a poly(ethylene oxide) moiety. A precursor silane, labeled A, is linked to a secondary substituent precursor labeled —(CH$_2$)—OH where n is greater than 0. A deprotonation agent is employed to convert the precursor silane to an intermediate silane labeled B. Suitable deprotonation agents include, but are not limited to, NaH, butyl lithium, potassium metal or sodium metal. The intermediate silane is a silane salt. For instance, the —OH from the precursor silane is converted to —O$^-$M$^+$ wherein M is sodium, potassium or lithium. A precursor solution is formed that includes the silane salt and a primary substituent precursor labeled C. The primary substituent precursor is a tosylate that includes a poly(alkylene oxide) moiety. The primary substituent precursor and the intermediate silane are reacted so as to form a tosylate salt and the product silane. The method illustrated in Figure can be adapted to forming silanes with substituents that include carbonate moieties by employing a tosylate that includes a carbonate moiety.

In some instances, a reaction solvent is added to the precursor solutions disclosed in the context of FIG. 2A through FIG. 2D. A suitable solvent includes, but is not limited to, THF, DMSO, DMF, and acetonitrile. A catalyst can be added to the precursor solution to catalyze the nucleophilic substitution. Suitable catalysts for use in the precursor solution include, but are not limited to, Et$_3$N, and pyridine. In some instances, the resulting solution can be filtered to extract a solid from a solution that includes the primary silane. Any remaining solvent can be removed from the solution to yield crude product. For instance, the pressure on the solution can be reduced so as to remove a solvent such as THF. The crude product can be further purified by removing unreacted first side chain precursor from the crude product. For instance, the solution can be dissolved in a second solvent such as toluene and unreacted first side chain precursor extracted with water. The extraction can continue until a signal from —OH signal is absent in an IR spectrum. The primary silane can be further purified by regular distillation, by fractional distillation, by vacuum distillation or by distillation using a long vacuum jacketed Vigreux column. In some instances, a series of distillations is performed. When a sequence of two or more regular distillations is performed, a central fraction of the distillate can be used as the product for each distillation step.

Although the precursor silane illustrated in FIG. 2A through FIG. 2C have a single —(CH$_2$)$_n$Y linked to a silicon, when two first substituents are to be formed on a precursor silane, the precursor silane can include more than one —(CH$_2$)$_n$Y linked to the silicon. Further, the value of n can be different in each of the —(CH$_2$)$_n$Y linked to the silicon.

The methods illustrated in FIG. 2A through FIG. 2D can be combined. As an example, the method of FIG. 2A and FIG. 2B can be combined so as to generate a primary silane having one or more first substituents that include a poly(alkylene oxide) moiety and one or more first substituents that include a cyclic carbonate moiety. For instance, a precursor solution can be generated that includes a primary substituent precursor according to FIG. 2A and a primary substituent precursor according to FIG. 2B.

The above methods for generating silanes can be performed sequentially to form a silane having different side chains. For instance, hydrosilylation can be employed to attach a side chain having a spacer to the silane precursor and then nucleophilic substitution can be employed to attach a side chain without a spacer to the same silane precursor. Additionally or alternately, hydrosilylation can be employed to attach a side chain having a cyclic carbonate group and then nucleophilic substitution can be employed to attach a side chain having a poly(alkylene oxide) moiety.

Additional methods of forming the above primary silanes are provided in U.S. patent application Ser. No. 10/810,080; filed on Mar. 25, 2004; entitled "Electrolyte for Use in Electrochemical Devices" and incorporated herein in its entirety. Each of the method disclosed above for generation of primary silanes can also be employed to generate the secondary silanes.

EXAMPLE 1

A silane represented by Formula I-D was generated with n=3. Tri(ethylene glycol) methyl ether (41.72 g, 0.254 mol, vacuum distilled), triethylamine (21.4 g, 0.212 mol), and anhydrous THF (250 mL) were syringed into a 500 mL flask. The flask was placed in an ice water bath. Trimethylchlorosilane (23.01 g, 0.212 mol, distilled) was then added dropwise to the flask. The resulting solution was stirred at room temperature for two hours. The result was warmed to 50° C. and filtered to separate a white solid from a solution that included the silane. The solvent THF was removed from the solution under reduced pressure to yield a crude product. The crude product was dissolved in toluene and any unreacted poly(ethylene oxide) was extracted with small portions of water (at least ten times) until no —OH signal (3400 cm$^{-1}$) was present in an IR spectrum. The silane was purified by fractional distillation and its structure confirmed spectroscopically.

EXAMPLE 2

A represented by Formula I-G was generated with m=3 and n=3. Tri(ethylene glycol) methyl ether (51.17 g, 0.312 mol, vacuum distilled), triethylamine (26.26 g, 0.26 mol), and anhydrous THF (250 mL) were syringed into a 500 mL flask which was placed in an ice water bath. The resulting solution was stirred and dimethyldichlorosilane (16.67 g, 0.130 mol, distilled) added to the solution. After adding the dimethyldichlorosilane, the result was stirred at room temperature for an additional two hours and then warmed to 50° C. and filtered to separate a white solid from a solution that included the silane.

The solvent was removed from the solution under reduced pressure to yield a crude product. The crude product was purified by fractional distillation and its structure was confirmed spectroscopically.

EXAMPLE 3

A silane represented by Formula I-O was generated with m=3 and n=3. Tri(ethylene glycol) methyl ether (10.0 g, 0.0526 mol, vacuum distilled), triethylamine (11.7 g, 0.116 mol), and anhydrous THF (100 mL) were syringed into a 250 mL flask which was placed in an ice water bath. The solution was stirred and dichloromethylphenylsilane (19.0 g, 0.116 mol) was added to the solution. The result was stirred at room temperature for about two more hours and then warmed to 60° C. and filtered to separate a white solid from a solution that included the silane. The solvent was removed from the solution under reduced pressure to yield a crude product. The crude product was dissolved in toluene and any unreacted poly(ethylene oxide) was extracted with small portions of water (five times). The silane was purified by distillation and its structure confirmed by $^1$H-NMR, $^{13}$C-NMR and $^{29}$Si-NMR.

EXAMPLE 4

A silane represented by Formula I-T was generated with n=4. Tetra(ethylene glycol) (25.0 g, 0.128 mol, distilled), triethylamine (30.9 g, 0.306 mol) and anhydrous THF (250 mL) were syringed into a 500 mL flask which was placed in an ice water bath. The resulting solution was stirred and trimethylchlorosilane (33.2 g, 0.306 mol., distilled) was added dropwise. The result was stirred at room temperature for about two more hours, then warmed to 60° C. and filtered so as to separate a white solid from a solution that included the silane. The solvent was removed from the solution under reduced pressure to yield a crude product. The crude product was then dissolved in toluene and unreacted poly(ethylene oxide) was extracted with small portions of water (three times). The silane was purified by fractional distillation and its structure confirmed by $^1$H-NMR, $^{13}$C-NMR and $^{29}$Si-NMR.

EXAMPLE 5

A silane represented by Formula I-R was generated. 4-(Hydroxymethyl)-1,3-dioxolan-2-one (12.0 g, 0.102 mol, distilled), triethylamine (11.3 g, 0.112 mol), and anhydrous THF (100 mL) were syringed into a 500 mL flask which was placed in an ice water bath. The resulting solution was stirred and trimethylchlorosilane (12.2 g, 0.112 mol, distilled) was added dropwise. The result was stirred at room temperature for about two more hours, then warmed to 50° C. and filtered to separate a white solid from a solution that included the silane. The solvent was removed from the solution under reduced pressure to yield a crude product. The crude product was dissolved in toluene and unreacted poly(ethylene oxide) was extracted with small portions of water (at least ten times) until no —OH signal (3400 cm$^{-1}$) was present in the IR spectrum. The silane was purified by short path distillation and its structure confirmed by $^1$H-NMR, $^{13}$C-NMR and $^{29}$Si-NMR.

EXAMPLE 6

A silane represented by Formula I-E was generated with n=3. Tri(ethylene glycol) methyl ether (29.32 g, 0.179 mol) was added to an NaH/THF suspension (0.197 mol, 7.87 g of 60% mixture in mineral oil) which was cooled in an ice water bath. The suspension was stirred and chloropropyltrimethylsilane (48.87 g, 0.3 mol, distilled) was added dropwise to the suspension. After addition of the chloropropyltrimethylsilane, the result was stirred at room temperature for about two more hours, then warmed to 50° C. and filtered to separate a white solid from a solution that included the silane. The solvent was removed from the solution under reduced pressure to yield a crude product. The crude product was purified by fractional distillation.

EXAMPLE 7

A silane represented by Formula I-F was generated with n=3. Tri(ethylene glycol) methyl ether (66.8 g, 0.366 mol) was added to a NaH/THF suspension (0.40 mol, 16.10 g of 60% mixture in mineral oil) which was cooled in an ice water bath. The suspension was stirred and chloromethyltrimethylsilane (50 g, 0.407 mol, distilled) was added dropwise to the suspension. After addition of the chloromethyltrimethylsilane, the result was stirred at room temperature for two hours, warmed to 50° C., and filtered to separate a white solid from a solution that included the silane. The solvent was removed from the solution under reduced pressure to yield a crude product. The crude product was purified by fractional distillation.

EXAMPLE 8

A silane represented by Formula I-I with m=2, n=2, and p=2 was generated. Di(ethylene glycol) methyl ether (43.2 g, 0.36 mol), 23.70 g pyridine (0.3 mol) and 250 ml THF were added into a flame-dried flask and then the flask was cooled by ice-water bath. Trichloromethylsilane 14.95 g (0.10 mol) was then added to the solution. White precipitate was observed. The mixture was stirred for 6 hours and warmed up to 50° C. for another 6 hours. The white solid was then filtered and the yellowish solution was Rotovapped to remove the THF. Vacuum distillation was employed to purify the product.

EXAMPLE 9

A silane represented by Formula I-H with m=2, and n=2 was generated by performing a hydrosilylation followed by a nucleophilic substitution (alcoholysis). Dimethylchlorosilane (16.27 g, 0.172 mol), di(ethylene glycol) methyl allyl ether (34.47 g, 0.215 mol), 0.15 mL Karstedt's catalyst and 150 mL distilled THF were added to a flame-dried flask and the flask was frozen into solid by liquid nitrogen. Vacuum was pulled on the frozen solid for 20 minutes and the flask was sealed. The solid was then warmed up to room temperature and then heated up to 75° C. for 12 hours, a brown reaction mixture was obtained.

The brown mixture was then added to a mixture of di(ethylene glycol) methyl ether (24.77 g, 0.206 mol), pyridine (13.59 g, 0.172 mol) and 250 mL THF. White precipitate was observed. The mixture was stirred for about 6 hours and warmed up to 50° C. for an additional 6 hours. The white solid was then filtered and the yellowish solution was Rotovapped to remove the THF. Vacuum distillation was employed to provide a purified colorless liquid.

EXAMPLE 10

A silane represented by Formula I-H with m=3, and n=3 was generated by performing a hydrosilylation followed by a nucleophilic substitution (alcoholysis). Dimethylchlorosilane (47.31 g, 0.50 mol), tri(ethylene glycol) methyl allyl ether (122.4 g, 0.6 mol), 0.25 mL Karatedt's catalyst and 150 mL distilled THF were added into a flame-dried flask and then the flask was frozen into solid by liquid nitrogen. Vacuum was pulled on the frozen solid for 20 minutes and the flask was sealed. The solid was warmed up to room temperature and heated up to 75° C. for about 12 hours. A brown reaction mixture was obtained.

The brown mixture was added to a mixture of tri(ethylene glycol) methyl ether (98.4 g, 0.6 mol), pyridine (39.5 g, 0.5 mol) and 500 mL THF. A white precipitate was observed. The mixture was stirred for about 6 hours and warmed up to 50° C. for another 6 hours. The white solid was then filtered and the yellowish solution was Rotovapped to remove the THF. Then vacuum distillation was employed to purify the product into a colorless liquid.

EXAMPLE 11

A silane represented by Formula I-J with m=3, n=3, and p=3 was generated by performing a hydrosilylation followed by a nucleophilic substitution (alcoholysis). Dimethylchlorosilane (23.01 g, 0.20 mol), tri(ethylene glycol) methyl allyl ether (48.96 g, 0.24 mol), 0.20 mL Karatedt's catalyst and 250 mL distilled THF were added into a flame-dried flask. The flask was frozen into solid by liquid nitrogen. Vacuum was pulled on the frozen solid for about 20 minutes and the flask was then sealed. The solid was warmed up to room temperature and heated to about 75° C. for 12 hours. A brown reaction mixture was obtained.

The brown mixture was added to a mixture of (78.72 g, 0.48 mol) tri(ethylene glycol) methyl ether, pyridine (15.8 g, 0.2 mol), and 250 mL THF. White precipitate was observed. The mixture was then stirred for about 6 hours and then warmed up to about 50° C. for about 6 hours. The white solid was then filtered and the yellowish solution was Rotovapped to remove the THF. Vacuum distillation was employed to remove the low boiling point materials.

EXAMPLE 12

A silane represented by Formula I-J with m=3, n=3, p=3, and q=3 was generated. Tri(ethylene glycol) methyl ether (78.72 g, 0.48 mol), pyridine (31.60 g, 0.4 mol) and 250 ml THF were added to a flame-dried flask and then the flask was cooled in an ice-water bath. Tetrachlorosilane (16.99 g, 0.10 mol) was added to the solution. White precipitate was observed. The mixture was then stirred for about 6 hours and warmed up to about 50° C. for another 6 hours. The white solid was filtered and the yellowish solution was Rotovapped to remove the THF. Vacuum distillation was employed to remove the low boiling point materials.

EXAMPLE 13

Electrolytes were made by dissolving lithium bis(oxalato) borate (LiBOB) in different silanes, at room temperature, to form 0.8 M electrolyte solutions. 2032 button cells were assembled by filling each electrolyte inside of a Teflon O-ring between two stainless steel discs. These button cells were used to measure the ionic conductivities of these electrolytes through use of ac impedance spectra. Table 1 shows ionic conductivity of several electrolytes prepared by using the silane based electrolytes. Table 1 shows that these silanes can yield an electrolyte with an ionic conductivity higher than $2.0 \times 10^{-4}$ S/cm at 25° C., higher than $6.0 \times 10^{-4}$ S/cm at 25° C. or higher than $1.0 \times 10^{-3}$ S/cm at 37° C. Further, the electrolytes show conductivity of up to $1.3 \times 10^{-3}$ S/cm at 37° C.

EXAMPLE 14

Figure 3:
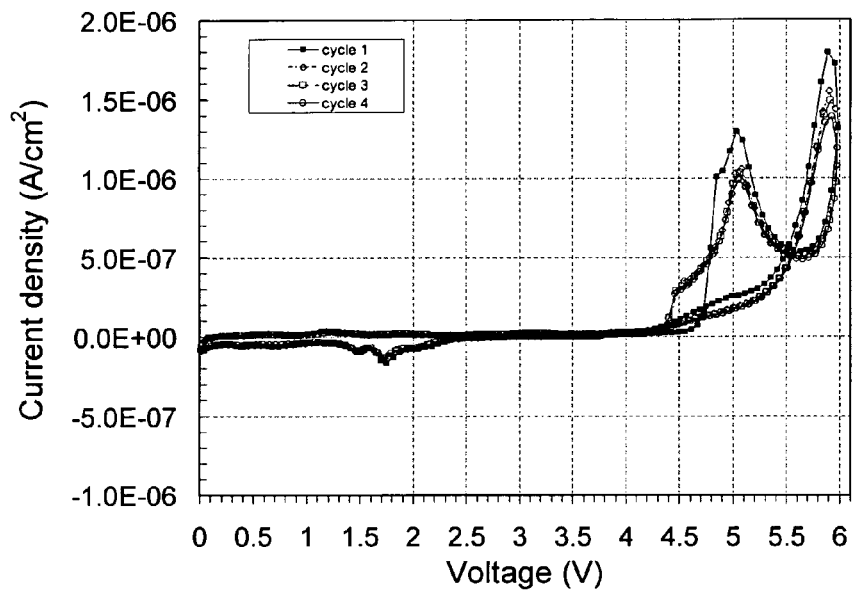
FIG. 3 presents the electrochemical stability profile for an electrolyte having a silane with one side chain that includes a poly(ethylene oxide) moiety.
Figure 4:
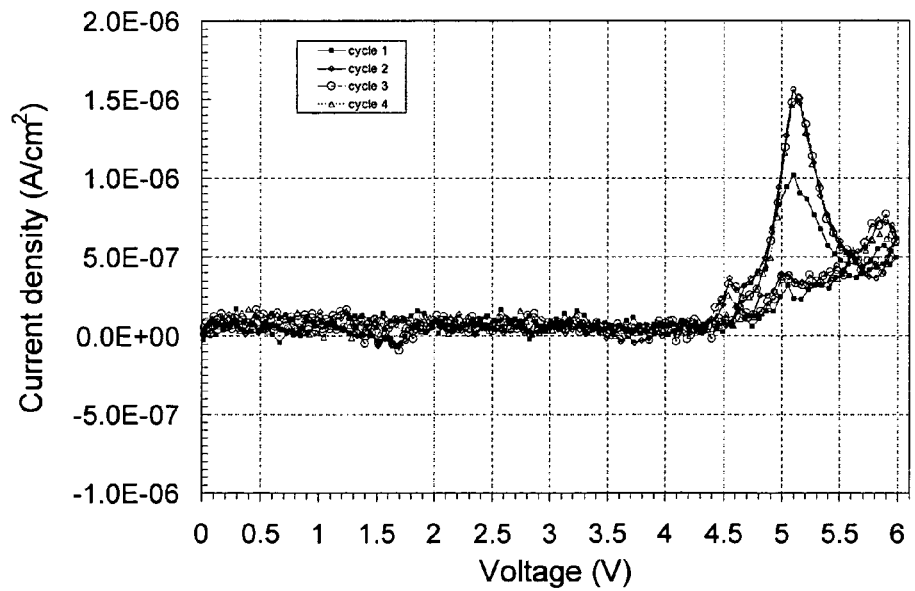
FIG. 4 presents the electrochemical stability profile for an electrolyte having a silane with two side chains that each include a poly(ethylene oxide) moiety.

A first electrolyte was prepared by dissolving LiBOB in the silane of Example 1, at room temperature, to 0.8 M. A second electrolyte was prepared by dissolving LiBOB in the silane of Example 2, at room temperature, to 0.8 M. The electrochemical stability window of the electrolytes was determined by cyclic voltammetry on a BAS-ZAHNER IM6 electrochemical analyzer using a three electrode system with platinum as the probe electrode and lithium as the reference and counter electrodes. Four cycles of the cyclic voltammetry test were conducted for the evaluations. FIG. 3 shows the electrochemical stability profile for the first electrolyte. FIG. 4 shows the electrochemical stability profile for the second electrolyte. The electrolytes are stable up to 4.5 V.

TABLE 1

| Formula | Example | Conductivity ($\times 10^{-4}$ S/cm) at 25° C. | Conductivity ($\times 10^{-4}$ S/cm) at 37° C. |
|---|---|---|---|
| Formula I-F, n = 3 | 7 | 9.79 | 12.5 |
| Formula I-E, n = 3 | 6 | 5.05 | 7.02 |
| Formula I-I, m = 2, n = 2, p = 2 | 8 | | 9.10 |
| Formula I-I, m = 3, n = 3, p = 3 | | | 6.95 |
| Formula I-D, n = 3 | 1 | 8.85 | 12.20 |
| Formula I-D, n = 4 | | 8.45 | 11.30 |
| Formula I-K, m = 2, n = 2, p = 2, q = 2 | | | 9.08 |
| Formula I-K, m = 3, n = 3, p = 3, q = 3 | 12 | | 5.7 |
| Formula I-D, n = 5 | | 7.10 | 9.75 |
| Formula I-G, m = 3, n = 3 | 2 | 5.79 | 9.00 |
| Formula I-G, m = 4, n = 4 | | 5.74 | 8.04 |
| Formula I-G, m = 5, n = 5 | | 3.41 | 5.12 |
| Formula I-O, n = 3, m = 3 | 3 | 2.80 | 4.33 |
| Formula I-T, n = 3 | 4 | 3.97 | 5.13 |
| 60 wt % Formula I-F, n = 3 and 40 wt % Formula I-N | 60 wt % 7 and 40 wt % 5 | 9.19 | 11.9 |
| 60 wt % Formula I-E, n = 3 and 40 wt % Formula I-N | 60 wt % 6 and 40 wt % 5 | 10.3 | 13.6 |

EXAMPLE 15

Figure 5:
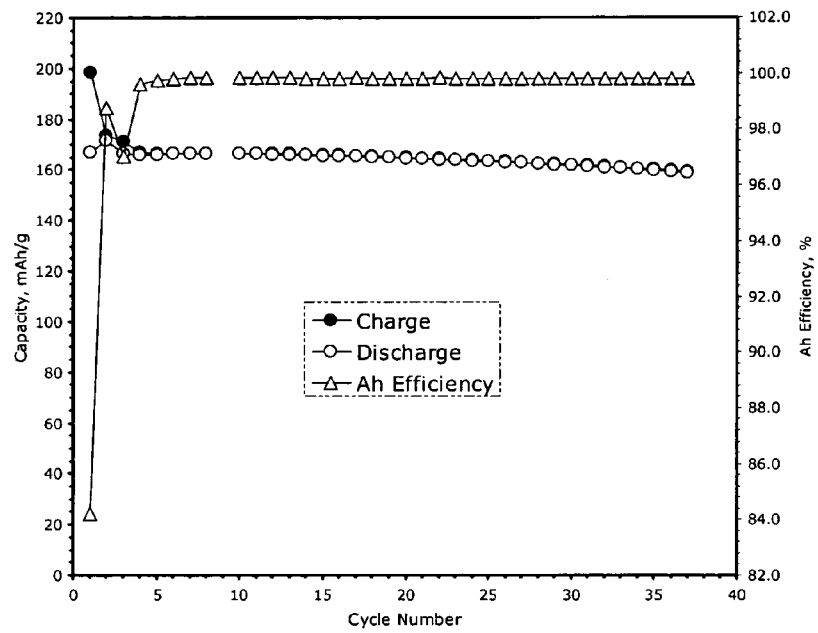
FIG. 5 presents cycle data for a secondary cell employing an electrolyte that includes a silane with two side chains that each include a poly(ethylene oxide) moiety.
Figure 6:
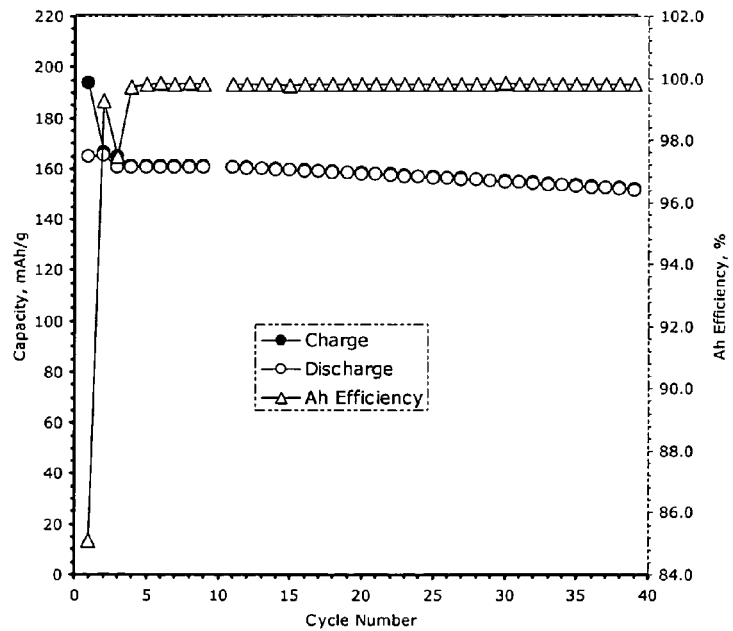
FIG. 6 presents cycle data for a secondary cell employing an electrolyte that includes a silane with one side chain having 3 repeating ethylene oxide units.
Figure 7:
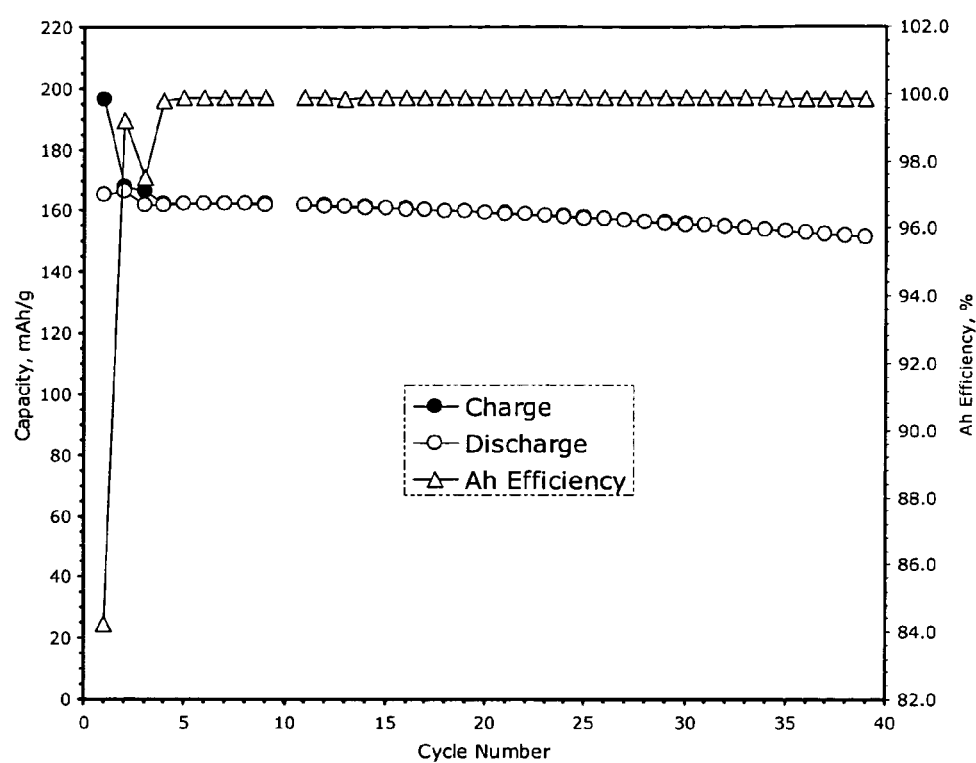
FIG. 7 presents the cycle data for a secondary cell employing an electrolyte that includes a silane with one side chain having 5 repeating ethylene oxide units.

A first electrolyte was prepared by dissolving LiBOB to 0.8 M in a silane according to Formula I-G with n=3 and m=3. A second electrolyte was prepared by dissolving LiBOB to 0.8 M in a silane according to Formula I-D with n=3. A third electrolyte was prepared by dissolving LiBOB to 0.8 M in a silane according to Formula I-D with n=5. Rechargeable cells were generated with each of the electrolytes. The cells each employed a cathode that was 84 wt % $LiNi_{0.8}Co_{0.15}Al_{0.05}O_2$, 8 wt % PVDF binder, 4 wt % SFG-6 graphite and 4 wt % carbon black; an anode that was 92 wt % meso carbon micro beads (MCMB) and 8 wt % PVDF binder; and a porous polypropylene membrane (Celgard 3501) separator. The effective cell area of the cells was 1.6 cm². The cycle performance of each cell was measured by cycling the cells between 3.0 V and 4.1 V using a charge and discharge rate of C/20 (0.1 mA) for the first two cycles for passivation layer formation and then C/10 (0.2 mA) for cycling. The tests were carried out at 37° C. FIG. 5, FIG. 6 and FIG. 7 respectively present the cycle data for the cell employing first electrolyte, the second electrolyte and the third electrolyte. The electrolytes shows good compatibility with MCMB graphite carbon resulting in an excellent discharge capacity of above 150 mAh/g with a columbic efficiency of 99.9%. Further, the cells each show a discharge capacity retention exceeding 90% after 35 cycles and more particularly exceeding 95% after 35 cycles.

EXAMPLE 16

Figure 8:
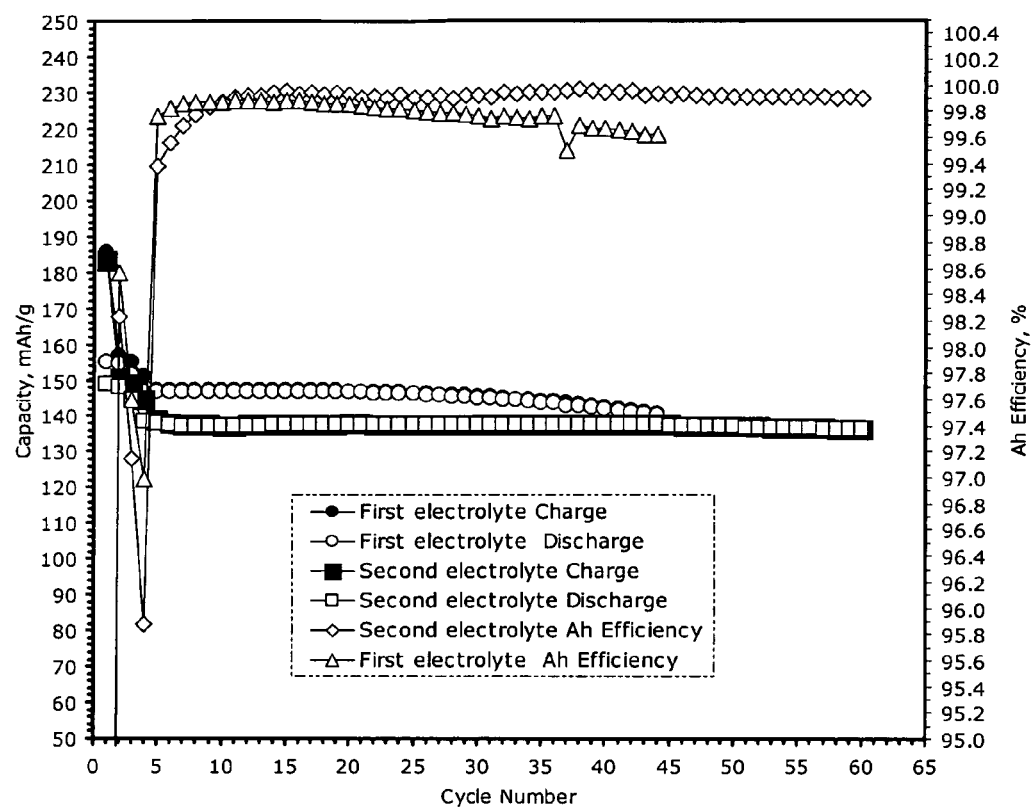
FIG. 8 compares the cycle data for a cell employing a first electrolyte and a cell employing a second electrolyte. The first electrolyte and the second electrolyte include different spacers positioned between a poly(alkylene oxide) moiety and a silicon.

A first electrolyte was prepared by dissolving LiBOB to 0.8 M in a silane according to Formula I-F with n=3. A second electrolyte was prepared by dissolving LiBOB to 0.8 M in a silane according to Formula I-E with n=3. Rechargeable cells were generated with each of the electrolytes. The cells each employed a cathode that was 84 wt % $LiNi_{0.8}Co_{0.15}Al_{0.05}O_2$, 8 wt % PVDF binder, 4 wt % SFG-6 graphite and 4 wt % carbon black; an anode that was 92 wt % meso carbon micro beads (MCMB) and 8 wt % PVDF binder; and a porous polypropylene membrane (Celgard 3501) separator. The effective cell area of the cells was 1.6 $cm^2$. The cycle performance of each cell was measured by cycling the cells between 3.0 V and 4.0 V using a charge and discharge rate of C/20 (0.1 mA) for the first two cycles for passivation layer formation, C/10 (0.2 mA) for one cycle and then C/5 (0.4 mA) for subsequent cycling. The tests were carried out at 37° C. FIG. 8 presents the cycle data for the cell employing first electrolyte and the second electrolyte. The silane based electrolyte show charge/discharge capacity of about 140 mAh/g. Further, the cells each show a discharge capacity retention exceeding 95% after 50 cycles and more particularly exceeding 99% after 50 cycles.

EXAMPLE 17

Figure 9:
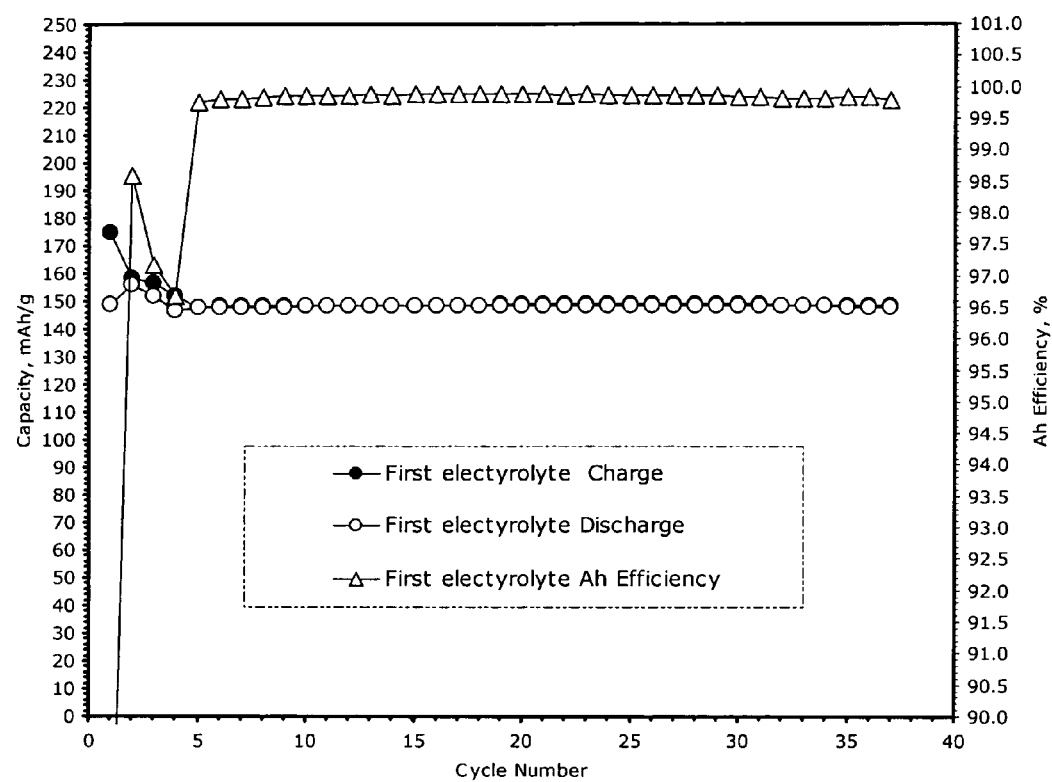
FIG. 9 presents cycle data for a cell employing an electrolyte that includes a solvent that is 40 wt % of a first silane and 60 wt % of a second silane. The first silane has a side chain that includes a cyclic carbonate moiety. The second silane has a side chain that include a spacer positioned between a poly(ethylene oxide) moiety and a silicon.
Figure 10:
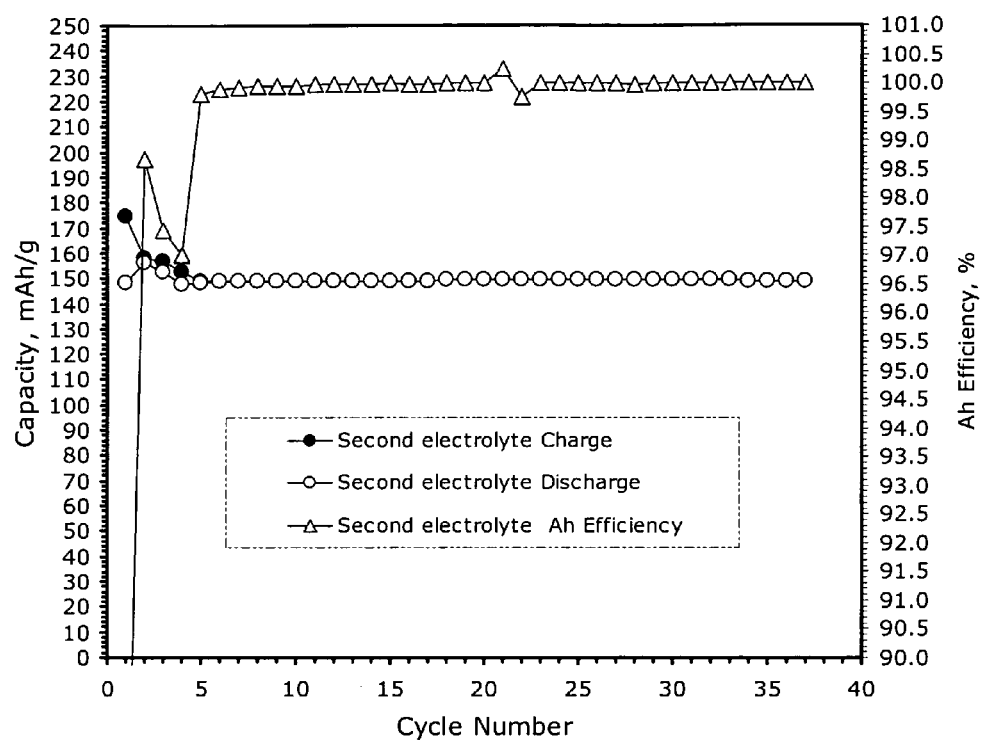
FIG. 10 presents the cycle data for a cell employing an electrolyte that includes a solvent that is 40 wt % of a first silane and 60 wt % of a second silane. The first silane has a side chain that includes a cyclic carbonate moiety. The second silane has a side chain with a poly(ethylene oxide) moiety that includes an oxygen linked to a silicon.

A first electrolyte was prepared by dissolving LiBOB to 0.8 M in a solution of 40 wt % of a silane according to Formula I-R and 60 wt % of a silane according to Formula I-F with m=3 and n=3. A second electrolyte was prepared by dissolving LiBOB to 0.8 M in a solution of 40 wt % of a silane according to Formula I-R and 60 wt % of a silane according to Formula I-D with n=3. Rechargeable cells were generated with each of the electrolytes. The cells each employed a cathode that was 84 wt % $LiNi_{0.8}Co_{0.15}Al_{0.05}O_2$, 8 wt % PVDF binder, 4 wt % SFG-6 graphite and 4 wt % carbon black; an anode that was 92 wt % meso carbon micro beads (MCMB) and 8 wt % PVDF binder; and a porous polypropylene membrane (Celgard 3501) separator. The effective cell area of the cells was 1.6 $cm^2$. The cycle performance of each cell was measured by cycling the cells between 3.0 V and 4.0 V using a charge and discharge rate of C/20 (0.1 mA) for the first two cycles for passivation layer formation, C/10 (0.2 mA) for one cycle and then C/5 (0.4 mA) for subsequent cycling. The tests were carried out at 37° C. FIG. 9 presents the cycle data for the cell employing first electrolyte. FIG. 10 presents the cycle data for the cell employing second electrolyte. The silane based electrolyte show charge/discharge capacity of about 140 mAh/g with a columbic efficiency of 99.9%. Further, the cells each show a discharge capacity retention exceeding 95% after 50 cycles and more particularly exceeding 99% after 50 cycles.

The electrolytes described above can be used in electrochemical devices such as primary batteries, secondary batteries and capacitors. Suitable batteries can have a variety of different configurations including, but not limited to, stacked configuration, and "jellyroll" or wound configurations. In some instances, the battery is hermetically sealed. Hermetic sealing can reduce entry of impurities into the battery. As a result, hermetic sealing can reduce active material degradation reactions due to impurities. In some instances, a reduction in impurity induced lithium consumption can stabilize battery capacity.

The electrolyte can be applied to batteries in the same way as carbonate-based electrolytes. As an example, batteries with a liquid electrolyte can be fabricated by injecting the electrolyte into a spiral wound cell or prismatic type cell. The electrolyte can be also coated onto the surface of electrode substrates and assembled with a porous separator to fabricate a single or multi-stacked cell that can enable the use of flexible packaging.

The solid and/or gel electrolytes described above can also be applied to electrochemical devices in the same way as solid carbonate-based electrolytes. For instance, a precursor solution having components for a solid electrolyte can be applied to one or more substrates. Suitable substrates include, but are not limited to, anode substrates, cathode substrates and/or separators such as a polyolefin separator, nonwoven separator or polycarbonate separator. The precursor solution is converted to a solid or gel electrolyte such that a film of the electrolyte is present on the one or more substrates. In some instances, the substrate is heated to solidify the electrolyte on the substrate. An electrochemical cell can be formed by positioning a separator between an anode and a cathode such that the electrolyte contacts the anode and the cathode.

An example of a suitable secondary lithium battery construction includes the electrolyte activating one or more cathodes and one or more anodes. Cathodes may include one or more active materials such as lithium metal oxide, $Li_xVO_y$, $LiCoO_2$, $LiNiO_2$, $LiNi_{1-x}Co_yMe_zO_2$, $LiMn_{0.5}Ni_{0.5}O_2$, $LiMn_{0.3}Co_{0.3}Ni_{0.3}O_2$, $LiFePO_4$, $LiMn_2O_4$, $LiFeO_2$, $LiMc_{0.5}Mn_{1.5}O_4$, vanadium oxide, carbon fluoride and mixtures thereof wherein Me is Al, Mg, Ti, B, Ga, Si, Mn, Zn, and combinations thereof, and Mc is a divalent metal such as Ni, Co, Fe, Cr, Cu, and combinations thereof. Anodes may include one or more active materials such as graphite, soft carbon, hard carbon, amorphous carbon, $Li_4Ti_5O_{12}$, tin alloys, silica alloys, intermetallic compounds, lithium metal, lithium metal alloys, and combinations thereof. An additional or alternate anode active material includes a carbonaceous material or a carbonaceous mixture. For instance, the anode active material can include or consist of one, two, three or four components selected from the group consisting of: graphite, carbon beads, carbon fibers, and graphite flakes. In some instances, the anode includes an anode substrate and/or the cathode includes a cathode substrate. Suitable anode substrates include, but are not limited to, lithium metal, titanium, a titanium alloy, stainless steel, nickel, copper, tungsten, tantalum or alloys thereof. Suitable cathode substrates include, but are not limited to, aluminum, stainless steel, titanium, or nickel substrates.

Suitable anode constructions are provided in U.S. Provisional Patent Application Ser. No. 60/563,848, filed on Apr. 19, 2004, entitled "Battery Having Anode Including Lithium Metal;" and in U.S. Provisional Patent Application Ser. No. 60/563,849, filed on Apr. 19, 2004, entitled "Battery Employing Electrode Having Graphite Active Material;" and in U.S. patent application Ser. No. 10/264,870, filed on Oct. 3, 2002, entitled "Negative Electrode for a Nonaqueous Battery;" which claims priority to U.S. Provisional Patent Application Ser. No. 60/406,846, filed on Aug. 29, 2002, entitled "Negative Electrode for a Nonaqueous Battery;" each of which is incorporated herein in its entirety.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An electrochemical device, comprising:
   a liquid electrolyte including one or more salts and a silane, wherein the silane is represented by:

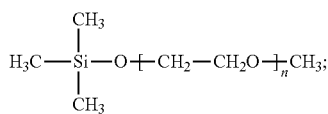

wherein n is 1 to 15.

2. The device of claim 1, wherein the silane is one of a plurality of silanes included in the electrolyte.

3. The device of claim 1, wherein the electrolyte further includes one or more secondary silanes represented by: $SiR_{4-z}R'_z$, wherein z is 1 to 3, R' is an alkyl, a halogenated alkyl, aryl, halogenated aryl, an alkoxy, a halogenated alkoxy or is represented by formula III-D; R is an alkoxy, a halogenated alkoxy, or is represented by formula III-D or is represented by formula III-F; z is the number of R' substituents included in the secondary silane and is 1 to 3; and (4-z) is the number of R substituents included in the secondary silane;

formula III-D:

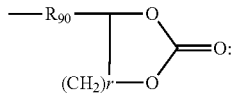

wherein $R_{90}$ is an organic spacer and r is 1 to 2; and formula III-F:

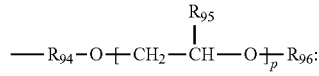

wherein $R_{94}$ is nil or an organic spacer; $R_{95}$ is hydrogen; alkyl or aryl; $R_{96}$ is alkyl or aryl;
p is 1 to 12.

4. The device of claim 1, wherein at least one of the one or more salts is a lithium salt.

5. The device of claim 1, wherein the molar concentration of the one or more salts is 0.1 to 3.0 M.

6. The device of claim 1, wherein at least one of the one or more salts is an organoborate salt.

7. The device of claim 1, wherein at least one of the one or more salts is chosen from the group consisting of $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, lithium alkyl fluorophosphates and lithium bis(chelato)borates.

8. The device of claim 1, wherein the electrochemical device includes an anode and the electrolyte includes an additive selected to form a passivation layer on the anode.

9. The device of claim 1, wherein the electrolyte further includes:
   one or more additives selected from the group consisting of vinyl carbonate (VC), vinyl ethylene carbonate (VEC), ethylene sulfite, 1,3-dimethylbutadiene, styrene carbonate, aromatic carbonates, vinyl pyrrole, vinyl piperazine, vinyl piperadine, vinyl pyridine, and mixtures thereof.

10. The device of claim 1, wherein the electrolyte includes a lithium bis(oxalato)borate (LiBOB) salt and one or more additives selected from the group consisting of VC and VEC.

11. The device of claim 1, wherein the device is lithium secondary battery wherein the electrolyte activates one or more lithium metal oxide cathodes and one or more anodes.

12. The device of claim 11, wherein at least one of the one or more cathodes include a material chosen from the group consisting of: $Li_xVO_y$, $LiCoO_2$, $LiNiO_2$, $LiNi_{1-x}Co_yMe_xO_2$, $LiMn_{0.5}Ni_{0.5}O_2$, $LiMn_{0.3}Co_{0.3}Ni_{0.3}O_2$, $LiFePO_4$, $LiMn_2O_4$, $LiFeO_2$, $LiMc_{0.5}Mn_{1.5}O_4$, and mixtures thereof, wherein Me is Al, Mg, Ti, B, or Si, and Mc is a divalent metal.

13. The device of claim 11, wherein at least one of the one or more anodes include a material chosen from the group consisting of graphite, carbon, $Li_4Ti_5O_{12}$, tin alloys, silicon alloys, intermetallic compounds, lithium metal, and mixtures thereof.

* * * * *